(12) United States Patent
Takeuchi

(10) Patent No.: US 11,389,954 B2
(45) Date of Patent: Jul. 19, 2022

(54) ROBOT CONTROL DEVICE

(71) Applicant: Seiko Epson Corporation, Tokyo (JP)

(72) Inventor: Kaoru Takeuchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 225 days.

(21) Appl. No.: 16/394,178

(22) Filed: Apr. 25, 2019

(65) Prior Publication Data

US 2019/0329404 A1 Oct. 31, 2019

(30) Foreign Application Priority Data

Apr. 26, 2018 (JP) .............................. JP2018-084922

(51) Int. Cl.
*B25J 9/16* (2006.01)
*B25J 9/00* (2006.01)

(52) U.S. Cl.
CPC ............. *B25J 9/161* (2013.01); *B25J 9/0081* (2013.01)

(58) Field of Classification Search
CPC . B25J 9/0081; B25J 13/081; B25J 9/00; B25J 9/1602; G05B 19/425; G05B 19/42; G05B 2219/36489
See application file for complete search history.

(56) References Cited

U.S. PATENT DOCUMENTS

| | | | |
|---|---|---|---|
| 9,138,893 B2 * | 9/2015 | Nagai | B25J 9/0081 |
| 9,707,680 B1 * | 7/2017 | Jules | B25J 9/1661 |
| 2012/0317535 A1 * | 12/2012 | Schmirgel | B25J 9/1661 717/100 |
| 2014/0188281 A1 | 7/2014 | Nagai et al. | |
| 2014/0347079 A1 * | 11/2014 | Min | G01R 31/001 324/750.01 |
| 2016/0089789 A1 * | 3/2016 | Sato | B25J 13/088 700/254 |
| 2016/0136815 A1 * | 5/2016 | Linnell | B25J 9/163 700/255 |
| 2016/0176048 A1 * | 6/2016 | Zimmermann | B25J 9/1664 901/46 |
| 2019/0232488 A1 * | 8/2019 | Levine | G06N 3/008 |
| 2019/0232492 A1 * | 8/2019 | Takeuchi | G05B 19/409 |
| 2019/0232493 A1 * | 8/2019 | Takeuchi | B25J 9/1633 |
| 2019/0255712 A1 * | 8/2019 | Takeuchi | B25J 13/06 |

FOREIGN PATENT DOCUMENTS

JP 2014-233814 A 12/2014

\* cited by examiner

*Primary Examiner* — Ryan Rink
(74) *Attorney, Agent, or Firm* — Gang Yu

(57) ABSTRACT

A robot control device that creates a control program for work of a robot with a force detector, the device includes a processor. the processor is configured to: display an input screen including an operation flow creation area for creating an operation flow of work including a force control operation on a display device; convert the created operation flow into a control program; and execute the control program to control the robot, and when an operation of the robot is not a predetermined operation set in advance after the control program is executed, the processor displays a screen for presenting a countermeasure for realizing the predetermined operation set in advance on the display device.

4 Claims, 23 Drawing Sheets

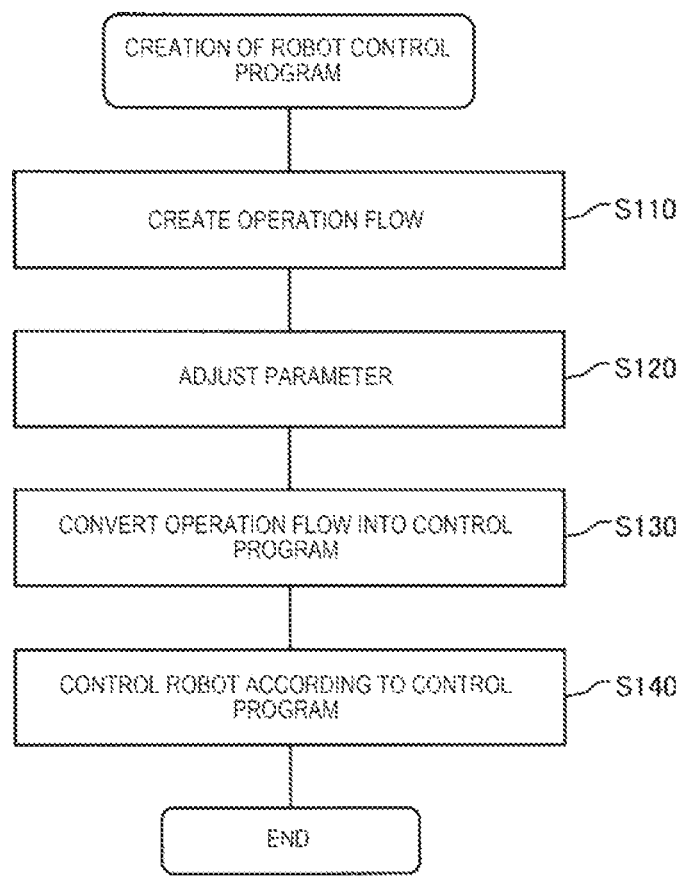

FIG. 7

| CATEGORY | OBJECT | SUMMARY |
|---|---|---|
| CONTACTING | 1. CONTACTING | MOVE IN DESIGNATED DIRECTION AND STOP WHEN RECEIVING REACTION FORCE |
| | 2. RELAXED | COPY FORCE OF DESIGNATED AXIS TO BE ZERO |
| COPYING | 3. COPYING AND MOVING | MOVE DESIGNATED TRAJECTORY WHILE COPYING FORCE OF DESIGNATED AXIS TO BE ZERO |
| | 4. SURFACE MATCHING | PRESS WHILE COPYING ANGLE IN DESIGNATED DIRECTION AND MATCH SURFACE TO SURFACE |
| PROBING | 5. PRESSING AND PROBING | FIND HOLE BY PRESSING AND PROBING IN DESIGNATED TRAJECTORY |
| | 6. CONTACTING AND PROBING | FIND HOLE BY REPEATING CONTACTING OPERATION |
| PRESSING | 7. PRESSING | PRESS WITH DESIGNATED FORCE IN DESIGNATED DIRECTION (DESIGNATED AXIS INCLUDES "COPYING") |
| | 8. PRESSING AND MOVING | MOVE WHILE PRESSING WITH DESIGNATED FORCE IN DESIGNATED DIRECTION (DESIGNATED AXIS INCLUDES "COPYING") |

FIG. 8C
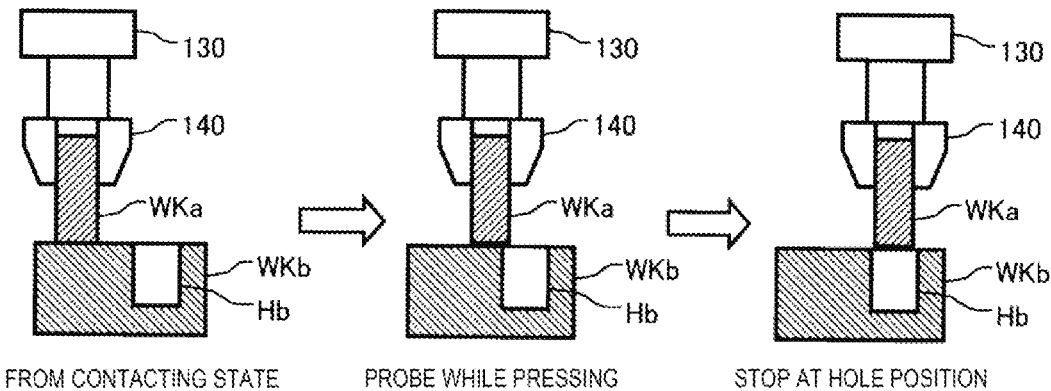
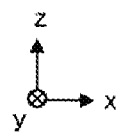
FIG. 8D
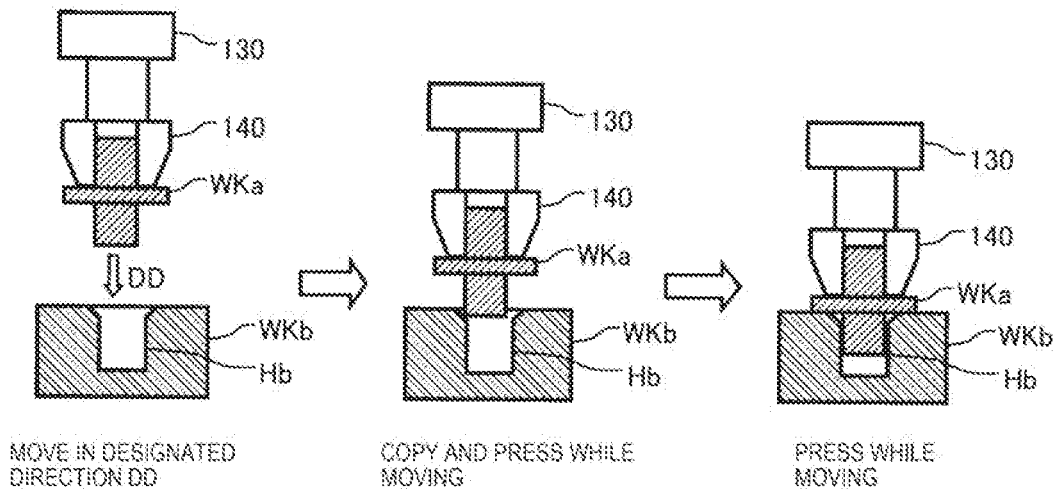
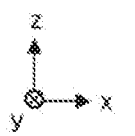

*FIG. 13*

TROUBLESHOOTING — TS

SELECT TROUBLE

BY OBJECT ▼
- CONTACTING
  - TIMEOUT WITHOUT CONTACTING
    - TIME CONSUMING
    - LARGE CONTACTING FORCE
    - NOT MOVING IN INTENDED DIRECTION
    - MAKING ERRONEOUS DETERMINATION AS CONTACTING BEFORE CONTACTING
+ RELAXED
+ PRESSING AND PROBING
+ PRESSING

CONTACTING OBJECT - TIMEOUT WITHOUT CONTACTING

OPERATION CAN BE ADJUSTED WITH PARAMETERS BELOW.
INCREASING TARGET FORCE INCREASES SPEED.
DECREASING FORCE CONTROL GAIN INCREASES SPEED.

TARGET MOVING DISTANCE: [ — ] mm  ← TF , PT

| PARAMETER | CURRENT SETTING VALUE | RECOMMENDED SETTING VALUE |
|---|---|---|
| TARGET FORCE | 5N | 5N |
| FORCE CONTROL GAIN | 1 | 1 |
| TIMEOUT TIME | 10s | 20s |
| PREDICTED OPERATION | | |
| PREDICTED MOVING DISTANCE | 100mm | 200mm |
| PREDICTED MOVING SPEED | 5mm/s | 5mm/s |
| PREDICTED CONTACTING TIME | — | — |

} CV1
} CV2

[ OK ] — BT3
[ NEW SETTING VALUE ] — BT4

FIG. 14

| | | | | TS |
|---|---|---|---|---|

TROUBLESHOOTING

SELECT TROUBLE

BY OBJECT ▼

| − | CONTACTING |
| | TIMEOUT WITHOUT CONTACTING |
| | TIME CONSUMING |
| | LARGE CONTACTING FORCE |
| | NOT MOVING IN INTENDED DIRECTION |
| | MAKING ERRONEOUS DETERMINATION AS CONTACTING BEFORE CONTACTING |
| + | RELAXED |
| + | PRESSING AND PROBING |
| + | PRESSING |

CONTACTING OBJECT - TIMEOUT WITHOUT CONTACTING

OPERATION CAN BE ADJUSTED WITH PARAMETERS BELOW.
INCREASING TARGET FORCE INCREASES SPEED.
DECREASING FORCE CONTROL GAIN INCREASES SPEED.

TARGET MOVING DISTANCE: [50] mm ← TF / PT

| PARAMETER | CURRENT SETTING VALUE | RECOMMENDED SETTING VALUE |
|---|---|---|
| TARGET FORCE | 5N | 5N |
| FORCE CONTROL GAIN | 1 | 1 |
| TIMEOUT TIME | 10s | 20s |
| PREDICTED OPERATION | | |
| PREDICTED MOVING DISTANCE | — | — |
| PREDICTED MOVING SPEED | 5mm/s | 5mm/s |
| PREDICTED CONTACTING TIME | 10s | 10s |

} CV1
} CV2

[ OK ] ~ BT3
[ NEW SETTING VALUE ] ~ BT4

ROBOT CONTROL DEVICE

The present application is based on and claims priority from JP Application Serial Number 2018-084922, filed Apr. 26, 2018, the disclosure of which is hereby incorporated by reference herein in its entirety.

BACKGROUND

1. Technical Field

The present disclosure relates to a robot control device.

2. Related Art

In a robot with a teaching playback robot system, a control program (job) representing work of a robot is created based on taught results. A teaching playback robot system means a system for operating a robot by executing a control program created by teaching. The procedure of creating the control program is called "teaching", and various teaching methods have been devised in the related art. JP-A-2014-233814 discloses a technology for displaying guidance information for setting parameters for operations of a robot on a screen of a teaching device in order to create a control program for a robot that executes force control using a force detector. A teacher (operator) can perform teaching by setting parameters according to the guidance information.

However, in the technology of the related art, it is possible to set various parameters for operations, but in general, since the teaching work of creating a control program of work requires skills, a technique which allows the teacher to more easily create the control program has been required.

SUMMARY (1) According to a first aspect of the present disclosure, there is provided a robot control device that creates a control program for work of a robot with a force detector. The robot control device includes a display control unit that displays an input screen including an operation flow creation area for creating an operation flow of work including a force control operation on a display device; a conversion unit that converts the created operation flow into a control program; and a control execution unit that executes the control program to control the robot. When an operation of the robot is not a predetermined operation set in advance after the control program is executed by the control execution unit, the display control unit displays a screen for presenting a countermeasure for realizing the predetermined operation set in advance on the display device.

(2) According to a second aspect of the present disclosure, there is provided a robot control device that creates a control program for work of a robot with a force detector. The robot control device includes a processor in which the processor is configured to (a) display an input screen including an operation flow creation area for creating an operation flow of work including a force control operation on a display device, (b) convert the created operation flow into a control program, and (c) execute the control program to control the robot. When an operation of the robot is not a predetermined operation set in advance after the control program is executed, the processor displays a screen for presenting a countermeasure for realizing the predetermined operation set in advance on the display device.

BRIEF DESCRIPTION OF THE DRAWINGS

FIG. 5 is a flowchart of a procedure for creating a robot control program.

FIG. 7 is an explanatory diagram showing an example of operation categories and operation objects constituting an operation flow.

FIG. 8C is an explanatory diagram showing a schematic operation of a pressing and probing object.

FIG. 8D is an explanatory diagram showing a schematic operation of a pressing and moving object.

FIG. 13 is an explanatory diagram showing another example of a countermeasure presentation area.

FIG. 14 is an explanatory diagram showing still another example of a countermeasure presentation area.

DESCRIPTION OF EXEMPLARY EMBODIMENTS

A. First Embodiment

Figure 1:
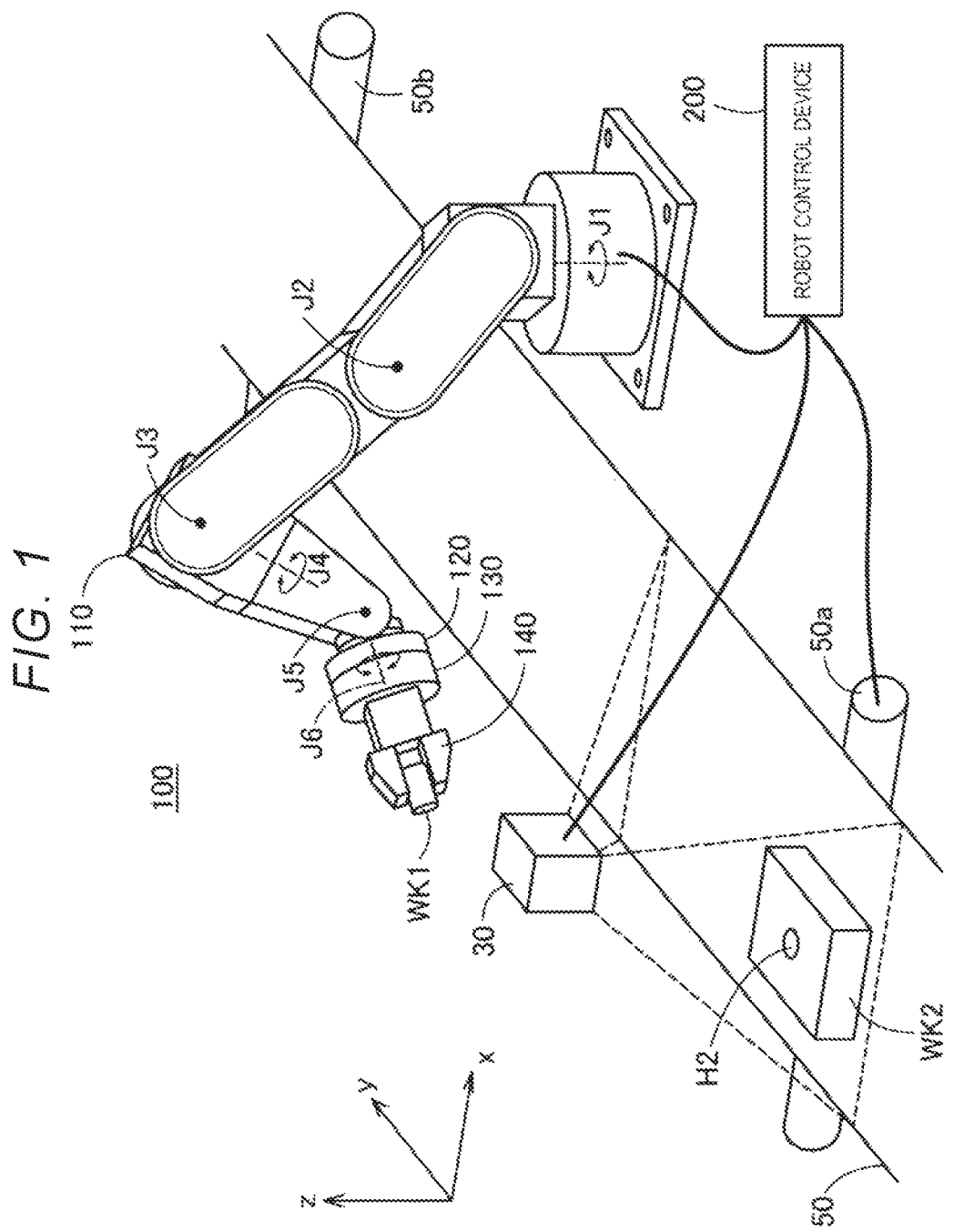
FIG. 1 is a perspective view of a robot system.

FIG. 1 is a perspective view of a robot system in a first embodiment. The robot system includes a camera 30, a transport device 50, a robot 100, and a robot control device 200. The robot 100 and the robot control device 200 are communicably connected via a cable or radio.

The robot 100 is a single arm robot that is used by attaching various end effectors on an arm flange 120 at a tip end of an arm 110. The arm 110 has six joints J1 to J6. The joints J2, J3, and J5 are bending joints and the joints J1, J4, and J6 are twisting joints. Various end effectors for performing work such as gripping and processing on an object (workpiece) are installed on the arm flange 120 at the tip end of the joint J6. A point in a vicinity of the tip end of the arm 110 can be set as a tool center point (TCP). The TCP is a position used as a reference of the positions of the end effectors, and can be set at any position. For example, a predetermined position on a rotation axis of the joint J6 can be set as the TCP. In the present embodiment, a six-axis robot is used, but a robot having another joint mechanism may be used.

The robot 100 can set the end effectors at any positions in any orientations within a movable range of the arm 110. A force detector 130 and an end effector 140 are installed on the arm flange 120. In the present embodiment, the end effector 140 is a gripper, but any other type of end effector can be used. The force detector 130 is a six-axis sensor that measures three-axis force acting on the end effector 140 and torque acting around the three axes. The force detector 130 measures magnitude of force parallel to three measurement axes orthogonal to each other in a sensor coordinate system which is a unique coordinate system, and the magnitude of torque around the three measurement axes. A force sensor as a force detector may be provided at any one or more joints J1 to J5 other than the joint J6. The force detector may only measure the force and torque in a direction of control, and a unit for directly measuring the force and torque like the force detector 130 or a unit for measuring the torque of the joint of the robot to obtain the force and the torque indirectly may be used. The force detector may measure the force and torque only in the direction of controlling force.

A coordinate system that defines a space in which the robot 100 is installed is called a robot coordinate system. A robot coordinate system is a rectangular coordinate system in three dimensions defined by an x axis and a y axis orthogonal to each other on a horizontal plane and a z axis with an upward vertical direction as a positive direction. The rotation angle around the x axis is represented by Rx, the rotation angle around the y axis is represented by Ry, and the rotation axis around the z axis is represented by Rz. Any position in the three-dimensional space can be represented by the position in the x, y, and z directions, and any orientation in the three-dimensional space can be represented by the rotation angle in the Rx, Ry, and Rz directions. Hereinafter, when expressed as "position" it may also mean position and orientation. When expressed as "force", it may also mean force and torque.

In the present embodiment, a workpiece WK2 is transported by the transport device 50. The transport device 50 includes transport rollers 50a and 50b. The transport device 50 can transport the workpiece WK2 placed on a transport surface by moving the transport surface by rotating these transport rollers 50a and 50b. The camera 30 is installed above the transport device 50. The camera 30 is installed such that the workpiece WK2 on the transport surface is in the visual field. A fitting hole H2 is formed on a surface of the workpiece WK2. The end effector 140 can perform work of fitting a workpiece WK1 gripped by the end effector 140 into the fitting hole H2 of the workpiece WK2. The fitting work may be performed in a state in which the transport surface is stopped, or, may be executed while moving the transport surface. The transport device 50 and the camera 30 can be omitted.

The robot control device 200 controls the arm 110, the end effector 140, the transport device 50, and the camera 30. The functions of the robot control device 200 are realized, for example, by a computer with a processor and a memory executing a computer program.

Figure 2:
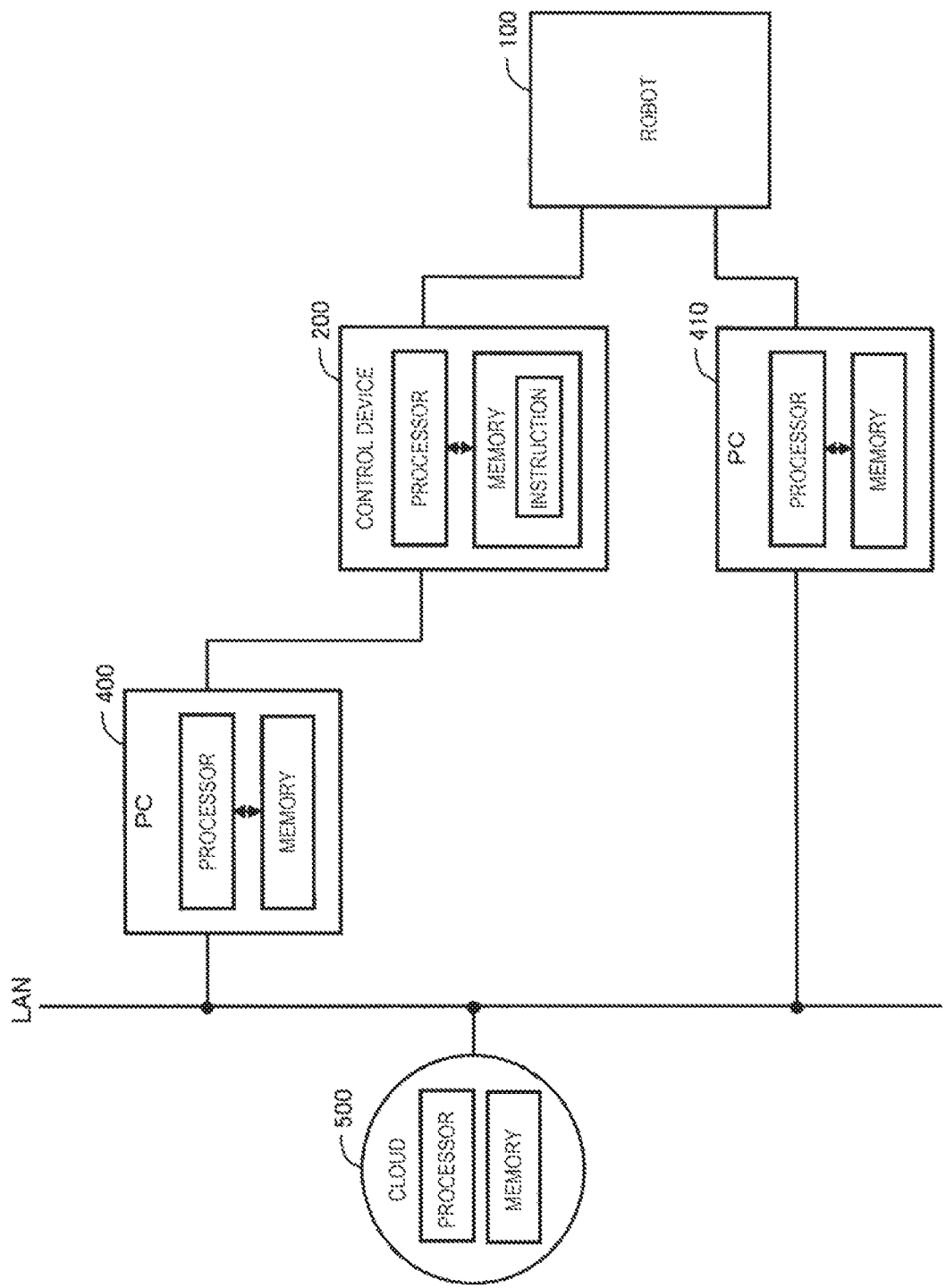
FIG. 2 is a conceptual diagram showing an example of a control device having a plurality of processors.

FIG. 2 is a conceptual diagram showing an example in which a control device of a robot is constituted by a plurality of processors. In the example, personal computers 400 and 410 and a cloud service 500 provided via a network environment such as LAN are illustrated in addition to the robot 100 and the control device 200 thereof. Each of the personal computers 400 and 410 includes a processor and a memory. A processor and a memory can be used in the cloud service 500. The control device of the robot 100 can be realized by using some or all of a plurality of these processors.

Figure 3:
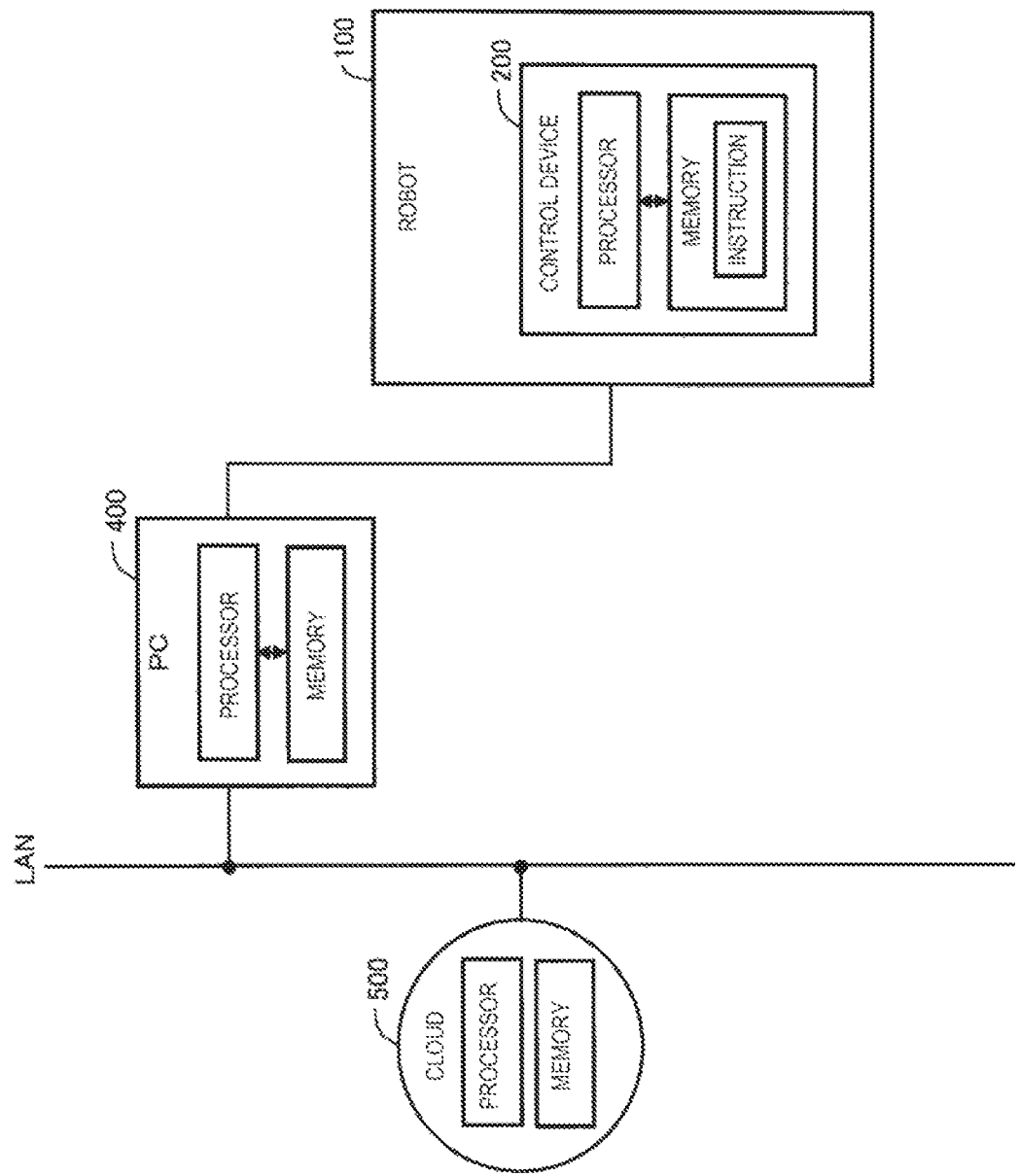
FIG. 3 is a conceptual diagram showing another example of the control device having the plurality of processors.

FIG. 3 is a conceptual diagram showing another example of a control device of a robot constituted by a plurality of processors. This example is different from FIG. 2 in that the control device 200 of the robot 100 is stored in the robot 100. The control device of the robot 100 can also be realized by using some or all of a plurality of these processors in this example.

Figure 4:
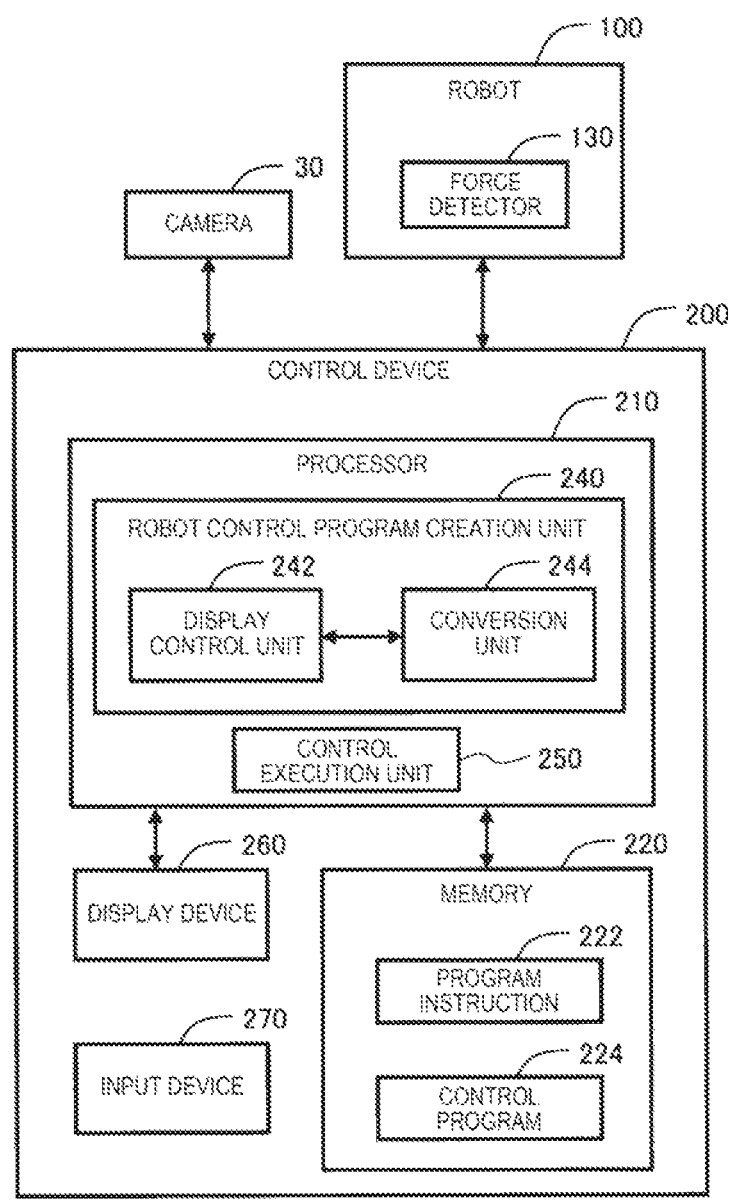
FIG. 4 is a functional block diagram of the control device.

FIG. 4 is a functional block diagram showing functions of the control device 200. The control device 200 includes a processor 210, a memory 220, a display device 260, and an input device 270. The memory 220 includes a main memory and a non-volatile memory. The processor 210 realizes functions of a robot control program creation unit 240 and a control execution unit 250 by executing a program instruction 222 stored in the memory 220 in advance. The robot control program creation unit 240 includes a display control unit 242 and a conversion unit 244. The display control unit 242 displays an input screen (described later) for creating an operation flow of work of the robot 100 on the display device 260. The conversion unit 244 converts the operation flow created in the input screen into a control program 224. The converted control program 224 is stored in the memory 220. The control program 224 may be written in a low level language such as a machine language, or, in a high level language such as a robot language. The control execution unit 250 causes the robot 100 to execute an operation of work by executing the control program 224 created as described above. The input device 270 is an input device such as a keyboard or a mouse, and the input and setting by a teacher are performed using the input device 270. Some or all of the functions of the robot control program creation unit 240 and the control execution unit 250 may be realized by a hardware circuit. The functions of the robot control program creation unit 240 will be described later.

FIG. 5 is a flowchart showing a procedure for creating a robot control program, and FIGS. 6A to 6D are explanatory diagrams of the procedure. The process in FIG. 5 starts when the teacher operates an application program for executing the robot control program creation unit 240.

Figure 6A:
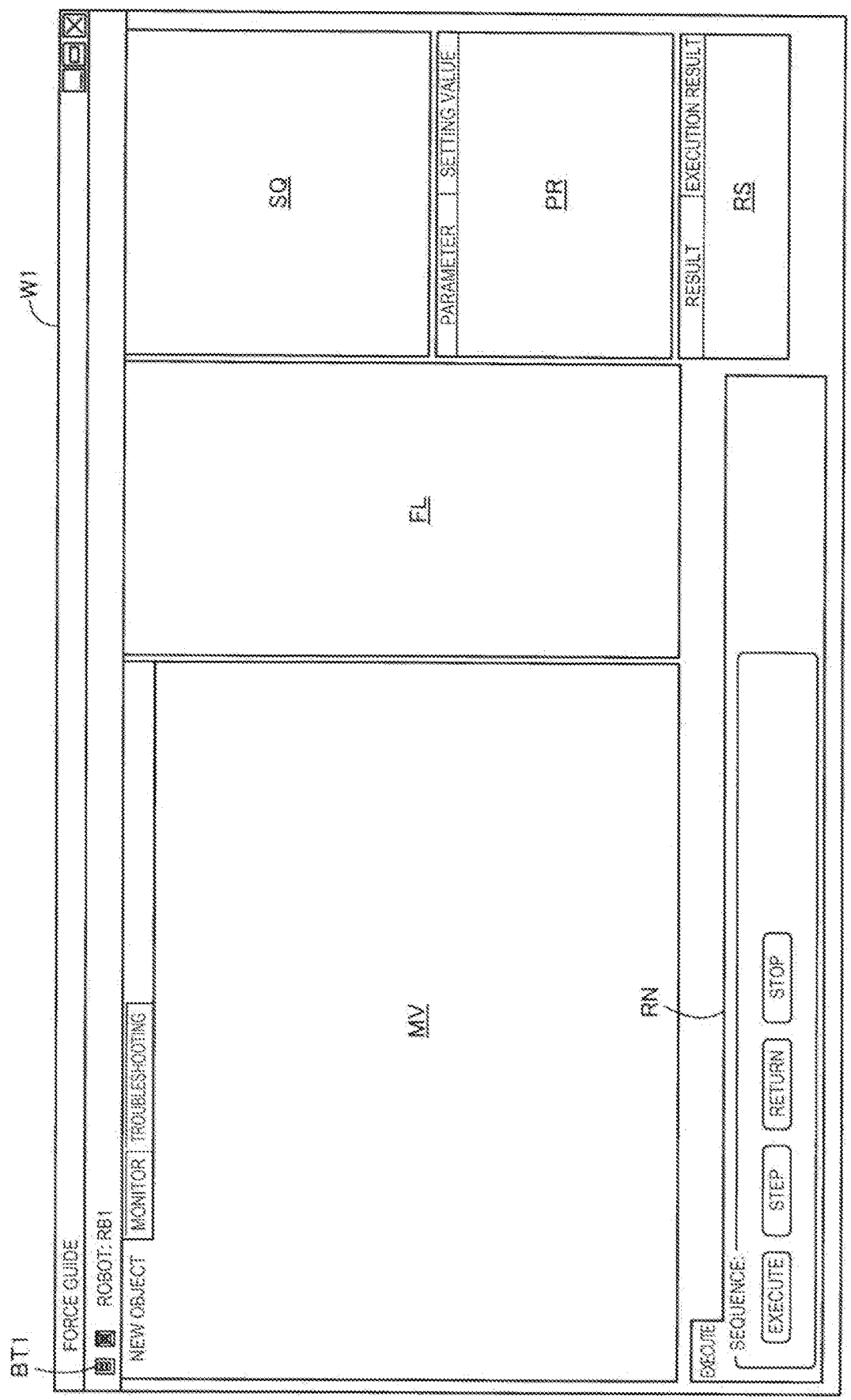
FIG. 6A is an explanatory diagram showing a procedure for creating a control program of work using a force detector.

FIG. 6A shows an example of a window W1 displayed on the display device 260 by the display control unit 242 when the robot control program creation unit 240 is operated. The window W1 corresponds to an input screen for creating an operation flow of work including one or more operations. The window W1 includes the following areas.

(1) Main view area MV is an area for displaying options of operation objects and conditional branch objects to be described later, execution results of a control program, and troubleshooting (countermeasure for problem), and the like.

(2) Operation flow creation area FL is an area for displaying the operation flows in which a plurality of objects are graphically placed in an editable manner. The work represented by the operation flow is also called "sequence".

(3) Sequence display area SQ is an area for displaying a tree structure of the sequence.

(4) Parameter setting area PR is an area for setting work parameters related to the entire work or operation parameters related to individual operations.

(5) Result area RS is an area for displaying execution results of the control program.

(6) Execution indication area RN is an area for indicating execution of the control program.

In the example in FIG. 6A, a plurality of areas in the window W1 may or may not be divided into different frames. A button BT1 for indicating the start of the procedure for creating the control program of the work is provided on the upper left of the window W1. When the teacher presses the button BT1, an input screen for starting step S110 in FIG. 5 is displayed on the display device 260 by the display control unit 242. In the present specification, the operation of the teacher inputting work parameter into a box or a field on the input screen will be referred to as "input", and receiving the parameter input by the teacher and changing into an inner value will be referred to as "setting".

Figure 6B:
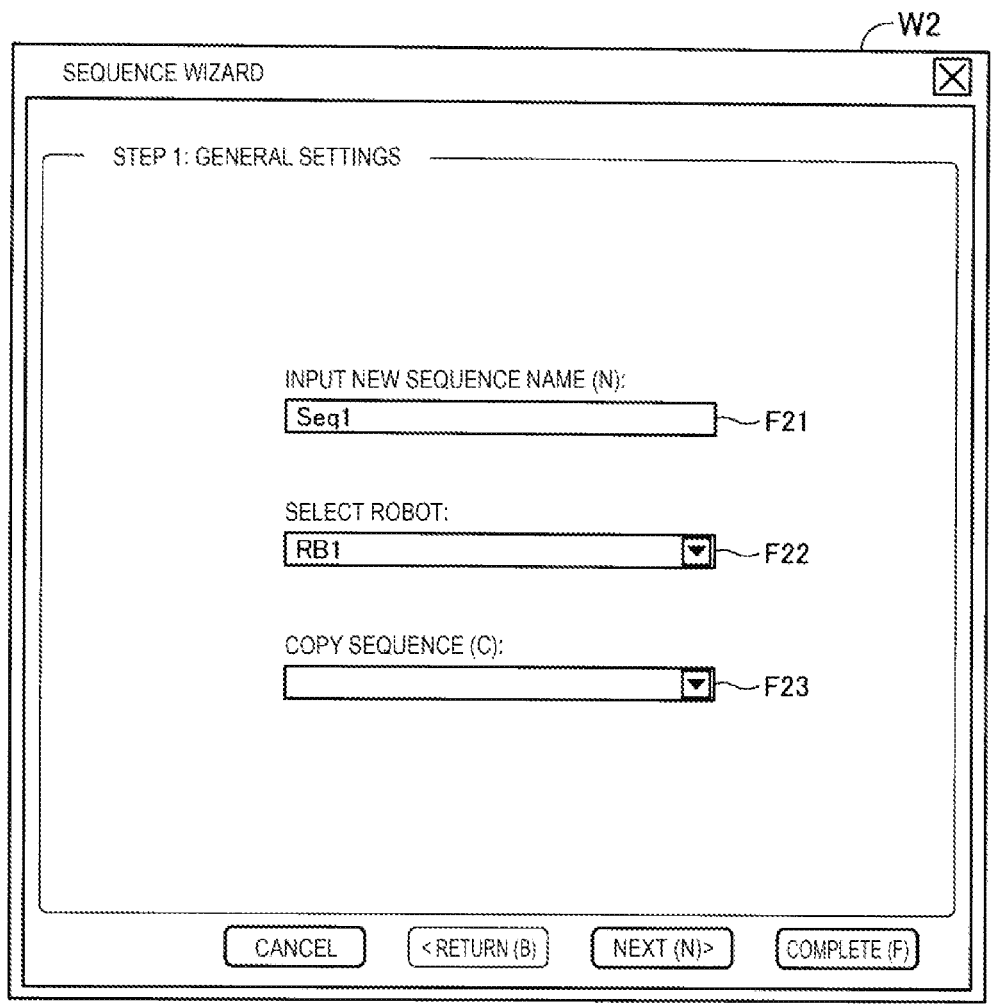
FIG. 6B is an explanatory diagram showing a procedure for creating a control program of work using a force detector.

FIG. 6B shows an example of a window W2 as an input screen for starting step S110. The window W2 includes the following areas.

(1) Sequence name setting area F21 is an area for setting a name for a new sequence. In the example in FIG. 6B, "Seq1" is input as the sequence name.

(2) Robot selection area F22 is an area for selecting the type of robot to be used from a plurality of options. In the example in FIG. 6B, an "RB1" type robot is selected.

(3) Sequence copy indication area F23 is an area for designating copying of an already created sequence. In this area, for example, sequence names of a plurality of sequences registered in the memory 220 in advance are displayed as a pull down menu. In the case where the sequence copy is used, settings described in FIG. 6C become unnecessary, and the procedure proceeds to the screen of FIG. 6D described later.

Figure 6C:
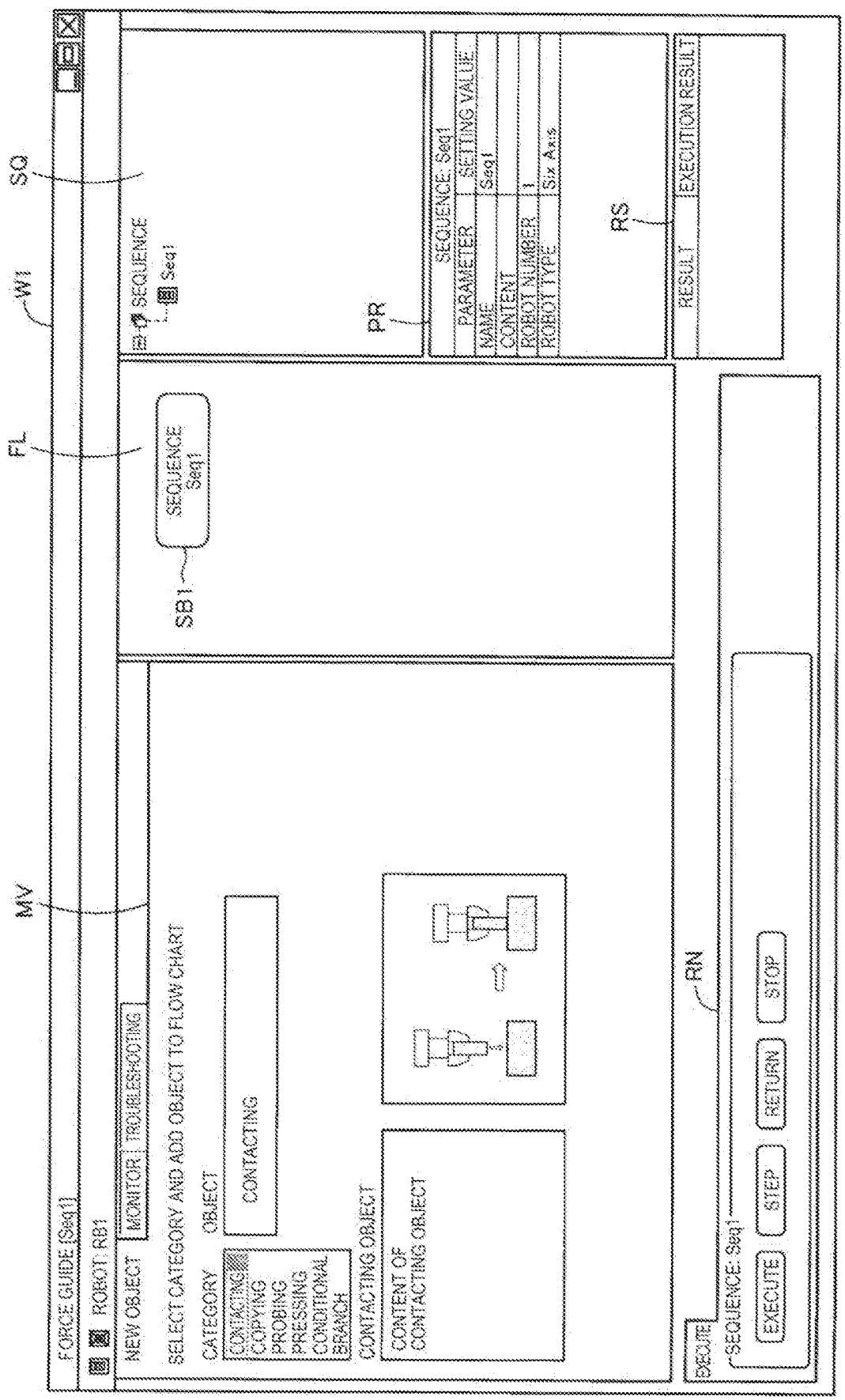
FIG. 6C is an explanatory diagram showing a procedure for creating a control program of work using a force detector.

In the present embodiment, the procedure proceeds to the screen of FIG. 6C without using the sequence copy. That is, in FIG. 6B, when the teacher presses a "next" button without inputting a sequence copy indication area F23, the display content of the display device 260 is changed to the window W1 shown in FIG. 6C.

FIG. 6C shows a state of starting the creation of the operation flow in the window W1 shown in FIG. 6A. The following contents are displayed in each area on the window W1.

(1) Main view area MV: a plurality of categories indicating the operations constituting the operation flow and the categories of the conditional branch, name, and icon of the object belonging to each of the categories, the description of the contents of the object, and an image showing the outline of the object are displayed. The object displayed on the main view area MV can be arbitrarily added to the operation flow in the operation flow creation area FL by a work such as drag and drop.

(2) Operation Flow Creation Area FL: the operation flow in which one or more objects are graphically placed is displayed in an editable manner. As shown in FIG. 6C, when starting the creation of the operation flow, only a sequence block SB1 showing the label of the sequence is placed in the operation flow creation area FL.

(3) Sequence Display Area SQ: the tree structure of the sequence displayed in the operation flow creation area FL is displayed.

(4) Parameter Setting Area PR: when one of the blocks placed in the operation flow creation area FL is selected, the parameter corresponding to the selected block is displayed.

Figure 6D:
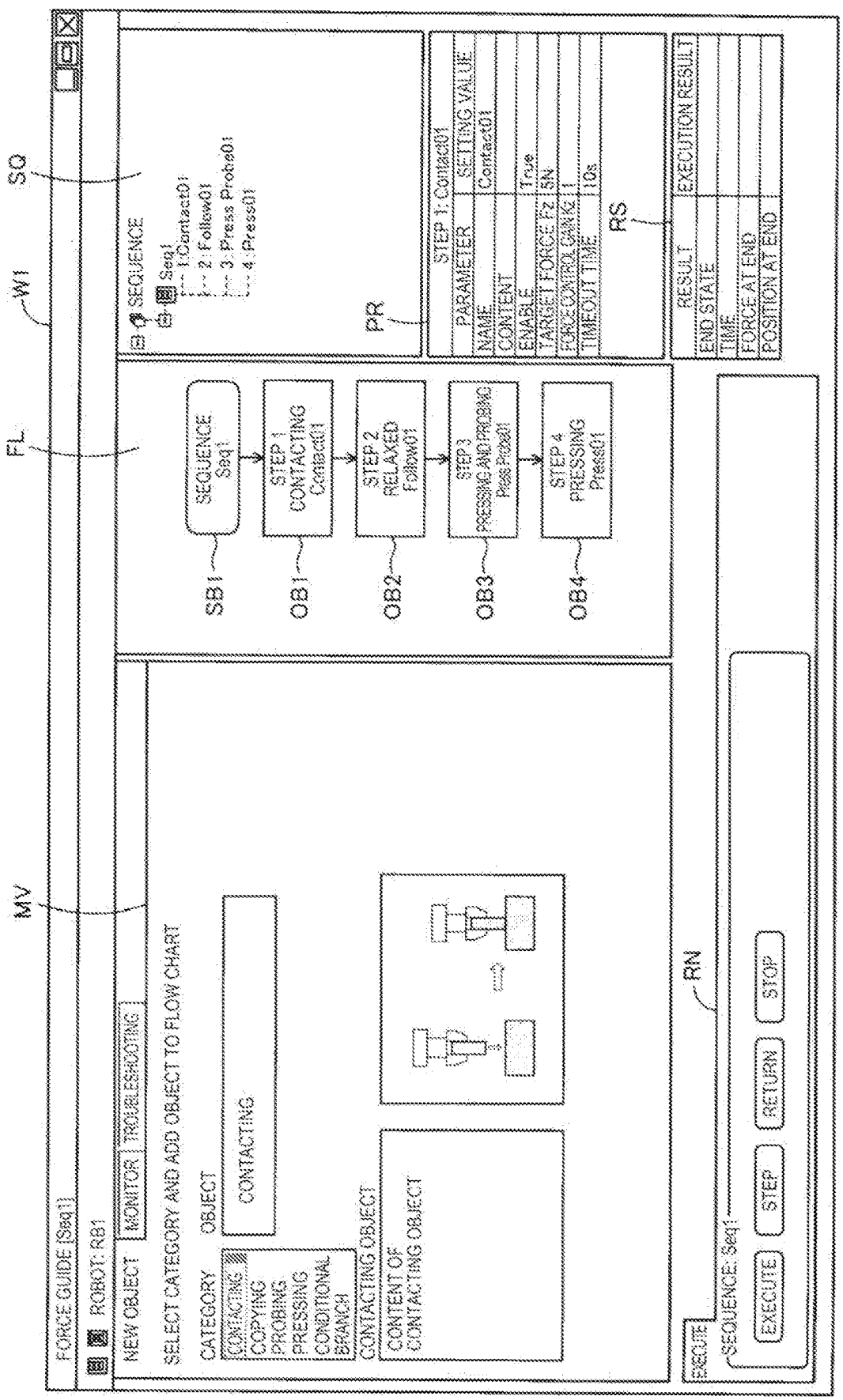
FIG. 6D is an explanatory diagram showing a procedure for creating a control program of work using a force detector.

FIG. 6D shows a state in which the teacher created the operation flow in the operation flow creation area FL on the window W1. In this example, blocks of a contacting object OB1, a relaxed object OB2, a pressing and probing object OB3, and a pressing object OB4 are placed in this order below the sequence block SB1. In the block of each object, the name of the object is displayed. The four objects OB1 to OB4 are all operation objects, but a conditional branch object may be placed. A conditional branch object means an object that can switch its destination depending on whether the preset conditions are satisfied or not. The categories of the operation and the operation objects will be described later. In the operation flow, any object displayed in the main view area MV can be arbitrarily added, and any object in the operation flow can be deleted.

In FIG. 6D, when one of the blocks SB1 and OB1 to OB4 placed in the operation flow creation area FL is selected, the parameters corresponding to the selected block are displayed in the parameter setting area PR. For example, when the sequence block SB1 is selected, the work parameters related to the entire sequence are displayed. When one the objects OB1 to OB4 of the object is selected, the parameters related to the objects are displayed. In the example of FIG. 6D, parameters related to the contacting object OB1 are displayed. These parameters are changed as necessary.

FIG. 7 shows an example of operation objects usable in constituting an operation flow, and FIGS. 8A to 8D show outlines of operations of some operation objects. A plurality of operation objects can be categorized into the following four categories. All of these operations involve force control.

Category 1: Contacting

Contacting is an operation of moving in a designated direction and stopping when receiving reaction force.

Figure 8A:
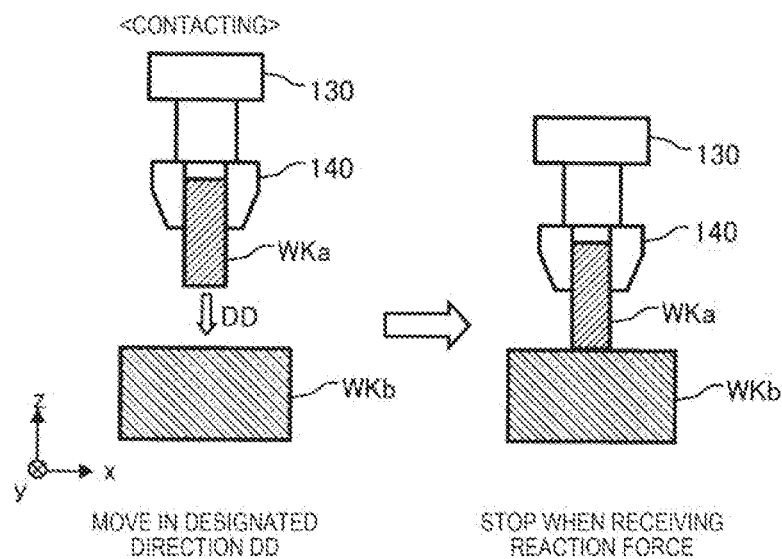
FIG. 8A is an explanatory diagram showing a schematic operation of a contacting object.

The category of the contacting operation includes a contacting object. As shown in FIG. 8A, in the contacting object, a workpiece WKa held by the end effector 140 is moved in a designated direction DD and the end effector 140 is stopped when the reaction force is measured by the force detector 130. The workpieces WKa and WKb shown in FIG. 8A have no relation to the workpieces WK1 and WK2 shown in FIG. 1, and are virtual workpieces for describing an outline of an operation. This point also applied to FIGS. 8B to 8D described later.

Category 2: Copying

Copying is an operation of maintaining the state in which the force of a designated axis becomes zero.

The category of the copying operation includes the following three types of operation objects.

(a) Relaxed object is a copying operation so that the force of the designated axis becomes zero.

Figure 8B:
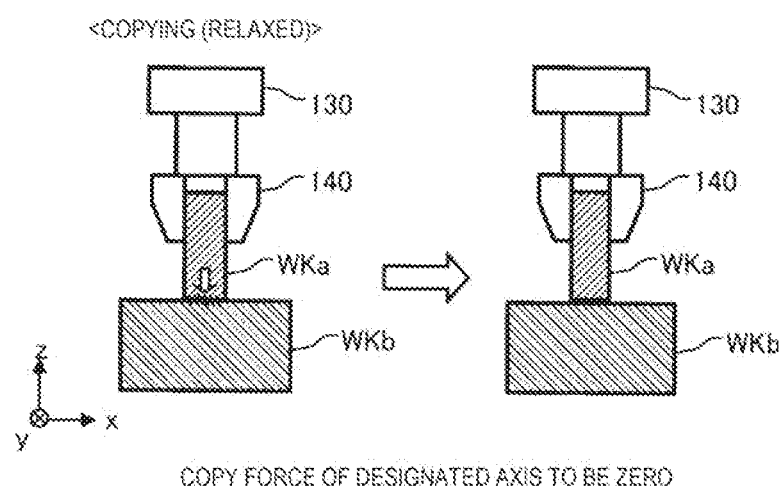
FIG. 8B is an explanatory diagram showing a schematic operation of a relaxed object.

As shown in FIG. 8B, in the relaxed object, the copying operation is executed so that the force of the designated axis becomes zero. In the example of FIG. 8B, the force in the z axis direction measured by the force detector 130 becomes zero by returning the end effector 140 in the −z direction when the force between the workpieces WKa and WKb in the z axis direction is not zero.

(b) Copying and moving object is an operation of moving along a designated trajectory while copying so as to set the force of the designated axis to zero.

(c) Surface matching object is an operation of copying and pressing at an angle in the designated direction to match the surface to surface.

Category 3: Probing

Probing is an operation of probing a position where the force of the designated direction becomes zero.

The category of the probing operation includes the following two types of operation objects.

(a) Pressing and probing object is an operation of finding a hole by pressing and probing along the designated trajectory.

As shown in FIG. 8C, in the pressing and probing object, a position where the force in the designated direction becomes zero is probed while the workpiece WKa held by the end effector 140 is pressed in the designated direction and the end effector is stopped at a position of a hole Hb. As a probing trajectory, one trajectory can be selected from a plurality of candidates such as a linear trajectory and a spiral trajectory.

(b) Contacting and probing object is an operation of finding a hole by repeating the contacting operation.

Category 4: Pressing

Pressing is an operation of pressing with designated force in the designated direction.

The category of the pressing operation includes the following two types of operation objects.

(a) Pressing (simple pressing) object is an operation of pressing with designated force in the designated direction. In this operation, "copying" operation can be executed with respect to other designated axes.

(b) Pressing and moving object is an operation of moving while pressing with designated force in the designated direction. In this operation, "copying" operation can be executed with respect to other designated axes.

As shown in FIG. 8D, in the pressing and moving object, the end effector 140 is moved in the designated direction DD and pressed with designated force, and then, is moved in a direction different from the designated direction while maintaining (that is copying) the pressing with designated force. In the example of FIG. 8D, an operation of inserting the workpiece WKa held by the end effector 140 into the hole Hb of a workpiece WKb is executed by the pressing and moving.

With respect to the operation objects OB1 to OB4 shown in FIG. 6D, a parameter defining end condition of an operation and a parameter defining a success determination condition of an operation can be set. For example, with respect to a contacting object OB1, following parameters can be set.

Parameters of Contacting Object OB1

(1) Example of Operation Parameters Defining Operation

Contacting direction: −Z direction (contacting direction is automatically set from the fitting direction set as the work parameter)
Estimated contacting distance: 10 mm
Operation speed: 5 mm/s
Force control gain at contacting: 1.0

(2) Example of End Condition

Target force: 5 N (operation stops when the target force exceeds 5 N)

(3) Example of Success Determination Condition

Success determination condition: timeout time=10 seconds (in the case where the end condition is satisfied until the timeout time, it is determined that the operation is successful, and in the case where the end condition is not satisfied, it is determined that the operation is failed)

Operation on failure: continue the sequence (Designate how to proceed when the operation is failed. It is possible to designate the continuance of the sequence or the end of the sequence.)

As can be understood from these examples, in the present embodiment, since it is possible to display the parameter setting area PR in which the parameters defining the operation, the parameters defining the end condition of the operation, and the parameters defining the success determination condition of the operation can be set, it is possible to easily create a control program including end of operation and success/failure determination. It may be a mode in which it is not possible to set one or both of the parameters defining the end condition of the operation, the parameters defining the success determination condition of the operation.

The end condition or the success determination condition of the operation parameter can be set to include a condition of executing determination based on the frequency of the force measured in the force detector 130.

Figure 9:
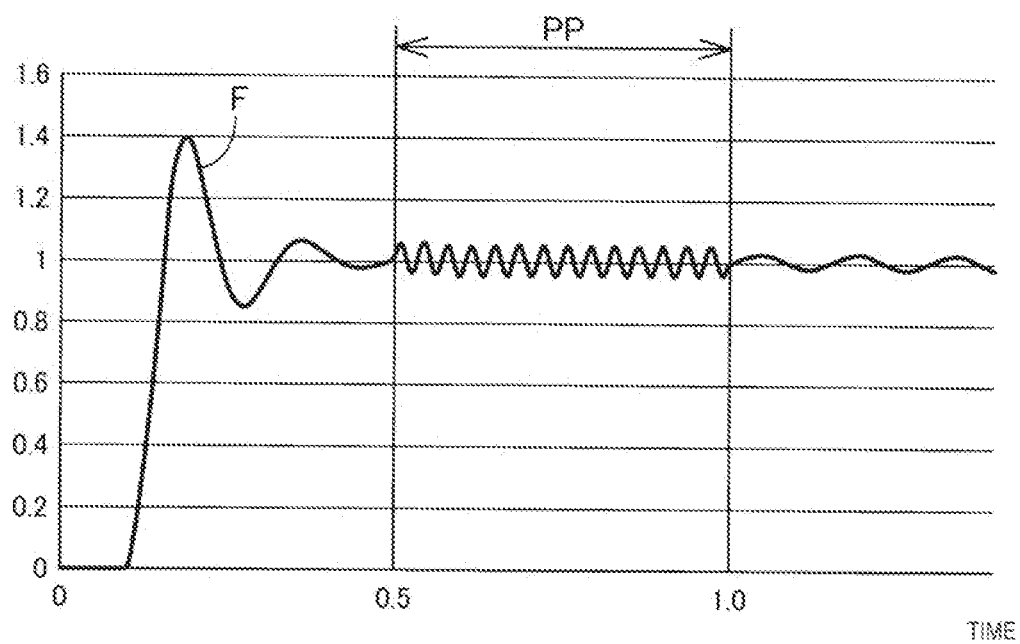
FIG. 9 is a graph showing an example of change in force measured by the force detector.

FIG. 9 is a graph showing an example of change in force F measured by the force detector 130. In this example, the force F vibrates during a period PP after 0.5 seconds from the start of the operation. Such a vibration can be an effect of a peripheral device (for example, operation of conveyor). In order to prevent the operation of the robot 100 from being influenced by the peripheral device, the control device 200 may execute frequency analysis of temporal change of the force F, and the detection of the power spectrum of the frequency designated in advance being equal to or lower than the threshold value or equal to or higher than the threshold value may be used as apart of the end condition or the success determination condition. In the example of FIG. 9, after the lapse of the period PP, that is, after the power spectrum of the frequency designated in advance is equal to or lower than the threshold value, it is possible to determine the end of the operation or the successor failure of the operation. Since the condition for determining based on the frequency of the force measured by the force detector 130 is used, it is possible to more correctly determine the presence or absence of the end of the operation or the success or failure of the operation even in a case where vibration is generated by the operation as shown in FIG. 9.

When the operation flow of the work is created as shown in FIG. 6D, it is possible to cause the robot 100 to execute the operation according to the operation flow. For example, when the teacher presses the "execute" button" in the execution indication area RN of FIG. 6D, the conversion unit 244 (FIG. 4) converts the operation flow into a control program, and the control execution unit 250 causes the robot 100 to execute the work by executing the control program. This corresponds to a trial of the control program.

Figure 10A:
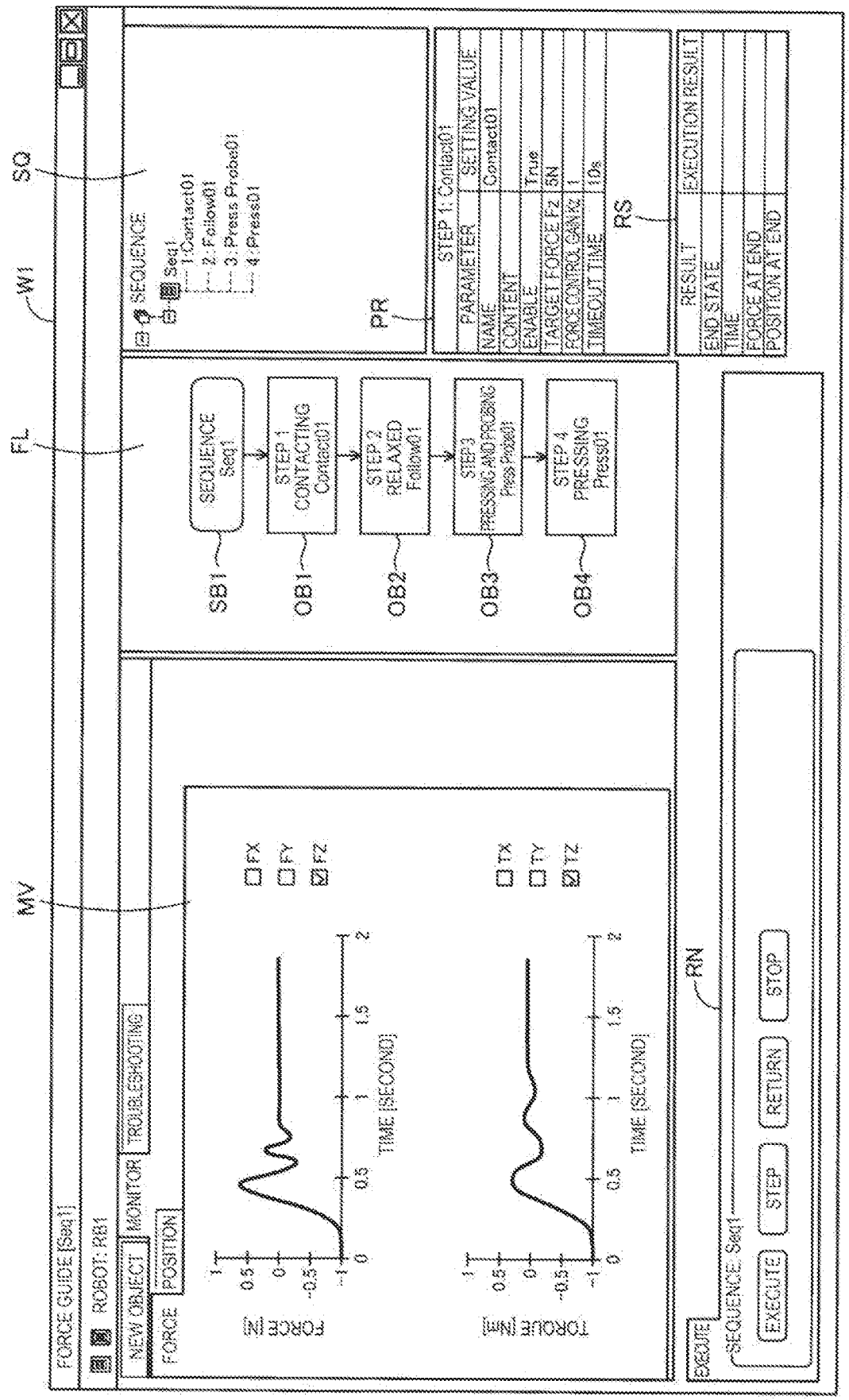
FIG. 10A is an explanatory diagram showing an example of a screen showing a result of work executed according to an operation flow.

FIG. 10A is an explanatory diagram showing an example of a screen showing a result of work executed according to an operation flow. In the main view area MV, the temporal change of the force Fx in the X axis direction and the torque Tx around the X axis is displayed among the plurality of force measured by the force detector 130 at the time of executing the operation flow. In the main view area MV, it is possible to select and display any one or more temporal change of force of the plurality of forces measured by the force detector 130. It is also possible to display the temporal change of the measured position of the TCP and the temporal change of the difference between the target position and the measured position of the TCP on the main view area MV.

The period of displaying the result in the main view area MV can be an operation period of any one of the operation objects in the operation flow, or can be the entire period from the start to stop of the execution. For example, when any operation object is selected in the operation flow creation area FL, the execution result of the operation period of the operation object is displayed. When the sequence block SB1 is selected, the result of the entire period from the start to stop of the execution is displayed. The period of displaying result in the main view area MV may be an operation period over a plurality of continuing operation objects. The information of some execution results of the control program is also displayed in the result area RS. For example, for any operation object, it is possible to display the end state of the operation (success or failure), time required for the operation, force at the end of the operation, the position at the end of the operation, and the like in the result area RS. Other types of results other than the one shown in FIG. 10A may be displayed in the main view area MV. For example, information related to the robot, such as the speed of the robot and the angle of each joint may be displayed.

It is preferable that the window W1 is further configured to include a field or a button for saving the data as the executed result in a desired place. By making it possible to store the execution result data, it is possible to compare with the past data in the adjustment described later. The data storage destination may be within the robot control device 200, or in the computer or the cloud connected to the robot control device 200. The data format may be a database or a file format.

The teacher can observe the execution result of the control program and adjust the parameters of individual objects as necessary (Step S120 in FIG. 5). The adjustment can be executed by changing the parameters of the object displayed in the parameter setting area PR in the state where any one of the objects OB1 to OB4 in the operation flow creation area FL is selected. As a specific example, for example, in a case where the force when contacting in the contacting operation is excessively large, the parameters of the contacting object are adjusted so as to lower the speed in the contacting operation.

Figure 10B:
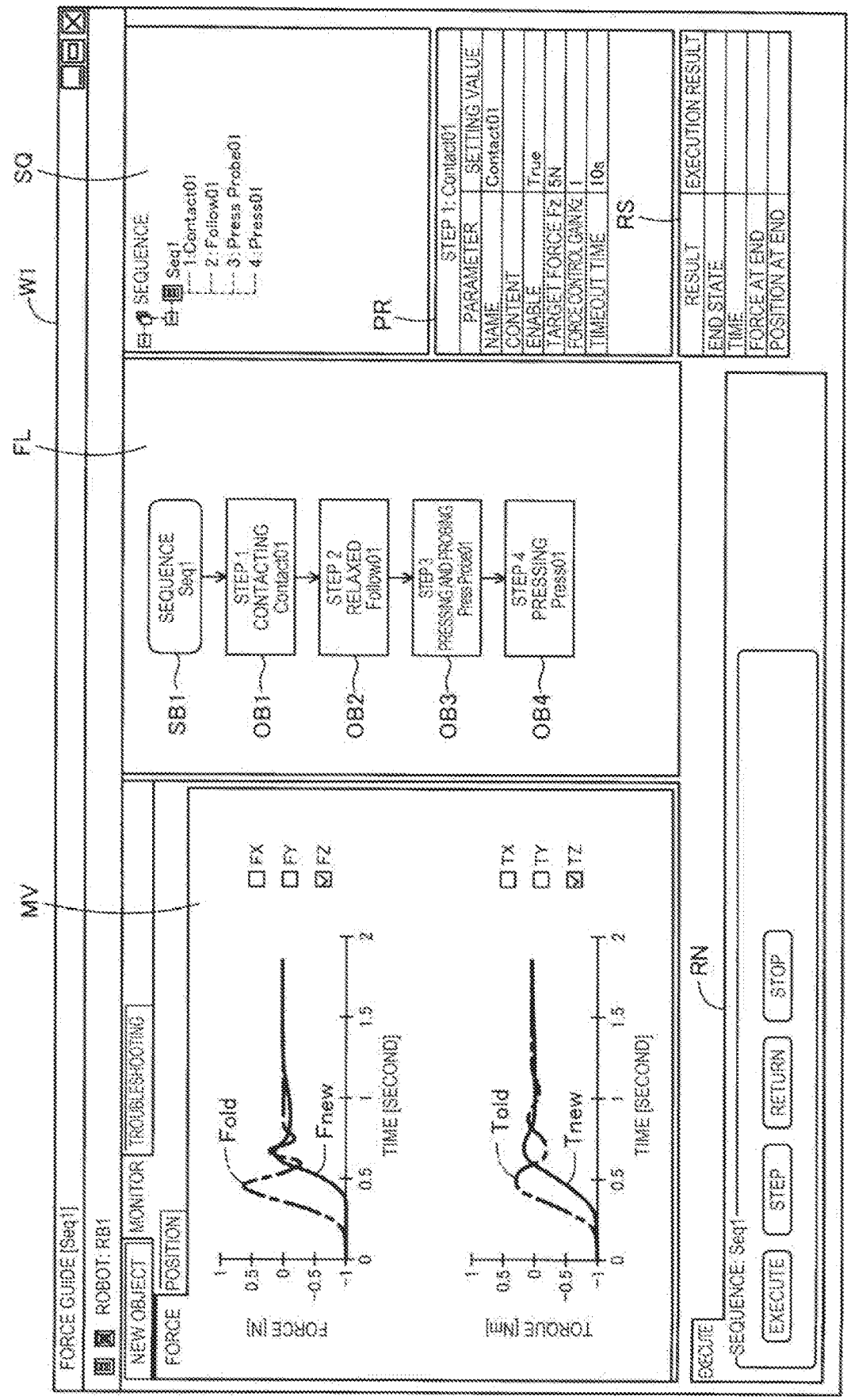
FIG. 10B is an explanatory diagram showing an example of a screen showing a re-execution result after adjustment of the parameters.

FIG. 10B shows an example of the result of a re-executing the control program after the adjustment of the parameters. In this example, the peaks of the force Fnew and Tnew after the adjustment are lower than the peaks of the force Fold and Told before the adjustment. In the window W1, since it is possible to perform the adjustment of the parameters of the object of the operation flow generated in the operation flow creation area FL and trial of the work according to the operation flow, an operation flow that runs appropriately can be easily created. As described in FIG. 10A, in the case where the data of the past execution result is saved, it is also possible to display the past data.

Figure 11:
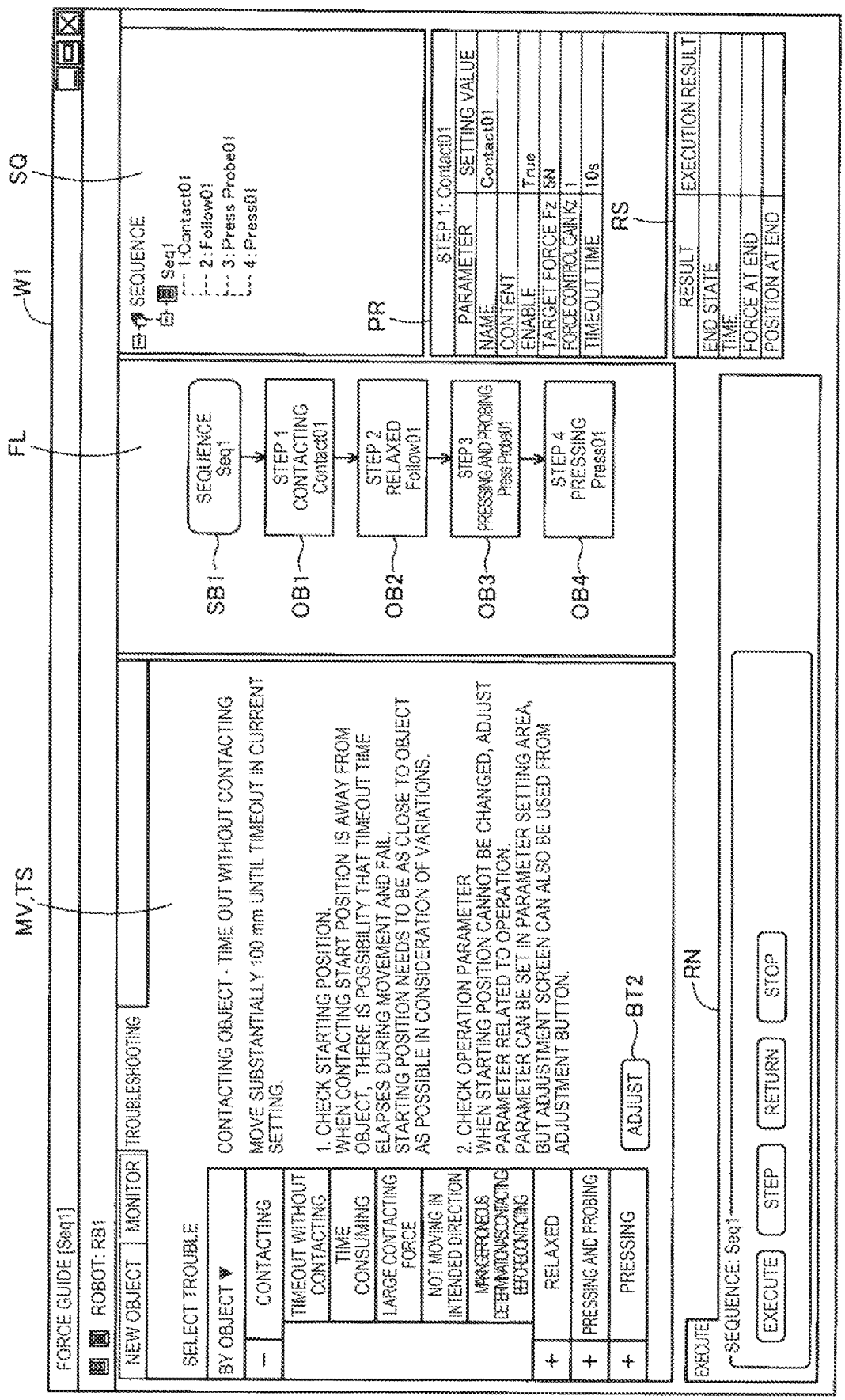
FIG. 11 is an explanatory diagram showing an example of a screen for presenting a countermeasure for a problem of a force control operation.

FIG. 11 is an explanatory diagram showing an example of a screen presenting a countermeasure for a problem of a force control operation. This input screen W1 is displayed by selecting a troubleshooting tab of the main view area MV after executing the control program. The main view area MV in this state is called "countermeasure presentation area TS". On the countermeasure presentation area TS, the names of the plurality of operation objects OB1 to OB4 constituting the operation flow are placed according to the operation flow, and the problem and the countermeasure of the operation object with a problem in execution result are displayed. Whether there is a problem in the operation object or not can be determined depending on, for example, whether the end condition or the success determination condition of the operation object is satisfied in the work trial or not. A "problem" means that the operation of the robot is not a predetermined operation set in advance.

In the countermeasure presentation area TS, only one operation object the teacher selected in the operation flow creation area FL may be displayed. Instead of displaying the countermeasure after selecting the troubleshooting tab of the main view area MV, the display control unit 242 may automatically detect a problem from the execution result of the control program and present a countermeasure against the detected problem. "Countermeasure against problem" can be also called "countermeasure for realizing the predetermined operation set in advance".

Figure 12:
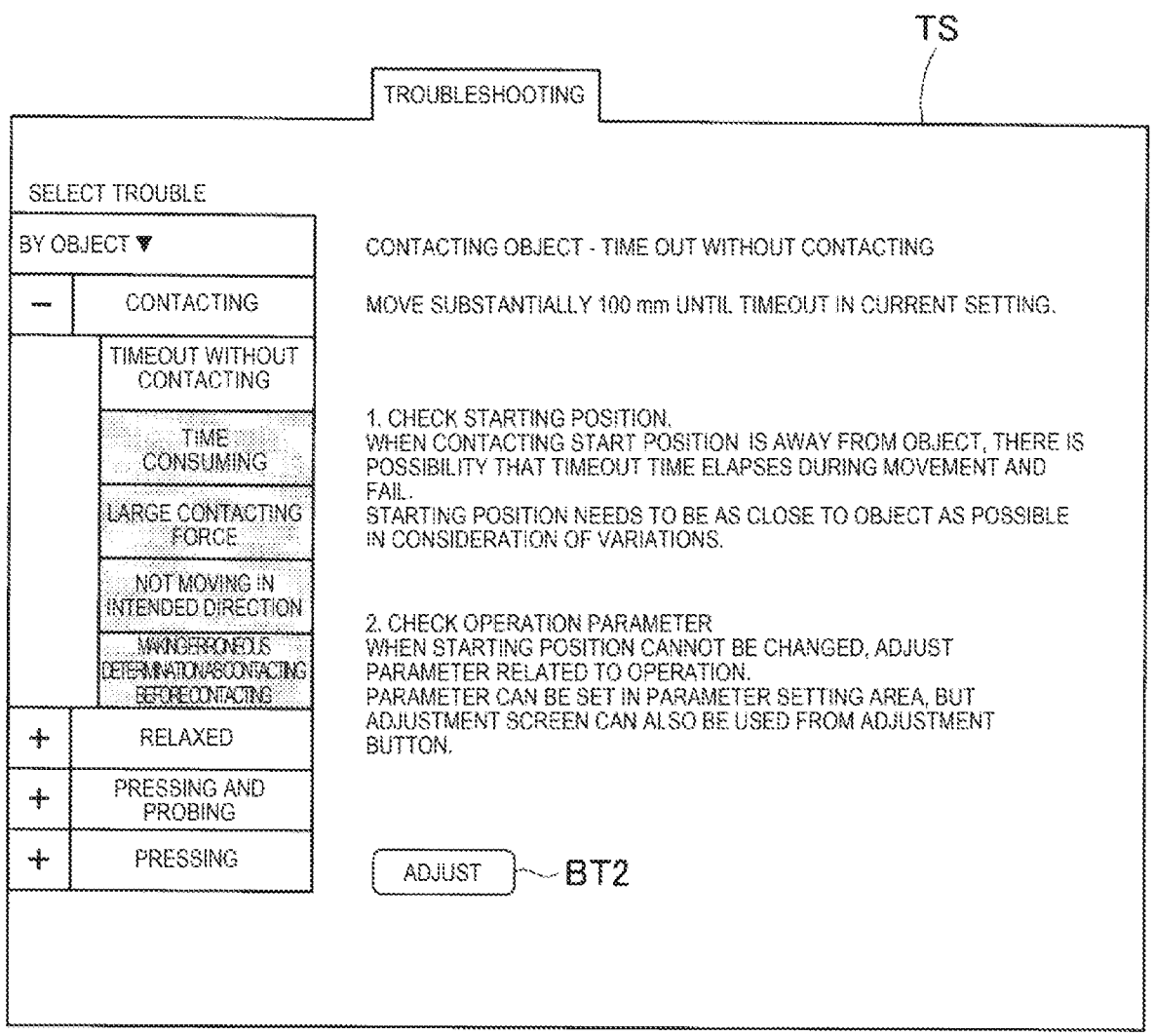
FIG. 12 is an explanatory diagram showing a countermeasure presentation area of FIG. 11 in an enlarged manner.

As shown in the enlarged view of FIG. 12, in this example, problems on the following five items regarding the contacting object are presented in the countermeasure presentation area TS.

"time out without contacting"
"time consuming"
"large contacting force"
"not moving in intended direction"
"making erroneous determination as contacting before contacting"

These five items refer to "items indicating that it is not a predetermined operation set in advance".

In FIG. 12, "time out without contacting" problem is selected by the teacher, so that countermeasures "1. check starting position" and "2. check operation parameter" are presented as the countermeasures against the problem. For the countermeasure "2. check operation parameter", a button BT2 for switching to a screen for adjusting the operation parameter is displayed.

FIG. 13 shows an example of the countermeasure presentation area TS displayed in a case where the button BT2 in FIG. 12 is pressed. This countermeasure presentation area TS includes a target value field TF and a parameter setting value table PT. As explanatory notes for explaining the direction of changing the parameters to solve the problem, sentences "increasing target force increases speed" and "decreasing force control gain increases speed" are displayed.

The target value field TF is a not a parameter of the operation object, but is a field for inputting a target value set to calculate a second characteristic value CV2 described later. In this example, the target moving distance in contacting operation is displayed as the target value field TF.

In the parameter setting value table PT, a parameter name of the operation object, a current setting value, and a recommended setting value are displayed. As a parameter of the parameter setting value table PT, it is preferable to present only the parameter related to the problem of the operation object among the plurality of parameters of the operation object. A "parameter related to problem" means a parameter that may solve the problem by adjusting the parameter. In the example of FIG. 13, three parameters "target force", "force control gain", and "timeout time" are presented as parameters related to the problem of the contacting object. When only the parameter related to the problem of the operation object is presented in the parameter setting value table PT as a countermeasure, the teacher can easily solve the problem of the operation object.

In the parameter setting value table PT, a characteristic value predicted from the parameters of the operation object is further displayed. Here, as characteristic values predicted from the parameters, three characteristic values "predicted moving distance", "predicted moving speed", and "predicted contacting time" are exemplified. Among these, "predicted moving distance" and "predicted moving speed" are characteristic values predicted only from the parameters of the contacting object. The characteristic value predicted only from the parameters of the operation object is called a "first characteristic value CV1". The "first characteristic value CV1" is also called a "first characteristic value calculated from the recommended setting value of the parameter". On the other hand, "predicted contacting time" is a characteristic value predicted from the parameters of the contacting object and the target value input in the target value field TF (target moving distance in the example of FIG. 13). The characteristic value predicted from the target value input in the target value field TF and the setting value of the parameter of the operation object is called a "second characteristic value CV2". The "second characteristic value CV2" is also called a "second characteristic value calculated from the target value and the recommended setting value of the parameter". However, in the example of FIG. 13, since the target value is not input in the target value field TF, the predicted contacting time value of the second characteristic value CV2 is not displayed.

The recommended setting value of the parameter displayed in the parameter setting value table PT is a setting value that may solve the problem of the operation. The recommended setting value is determined by the robot control program creation unit 240 according to the execution result of the control program.

In the countermeasure presentation area TS, a button BT3 that indicates acceptance of the recommended setting value and a button BT4 for switching to a screen for inputting a new setting value are included. When the button BT3 is pressed, the recommended setting value is applied, and when the teacher presses "execute" button in the execution indication area RN (FIG. 6D) later, the operation flow is executed again with the recommended setting value.

FIG. 14 shows the countermeasure presentation area TS which is displayed after the target value is input in the target value field TF in FIG. 13. In this example, the value of predicted contacting time, which is the second characteristic value CV2 determined from the target value input in the target value field TF and the setting value of the operation object, is displayed. Among the first characteristic values CV1 determined only from the parameters of the operation object, "predicted moving distance" is not displayed because it overlaps the target value input in the target value field TF, but the same value with the target value may be displayed.

By displaying the first characteristic value and the second characteristic value CV2 in the countermeasure presentation area TS, the teacher can easily solve the problem of the force control operation from these characteristic values.

Figure 15:
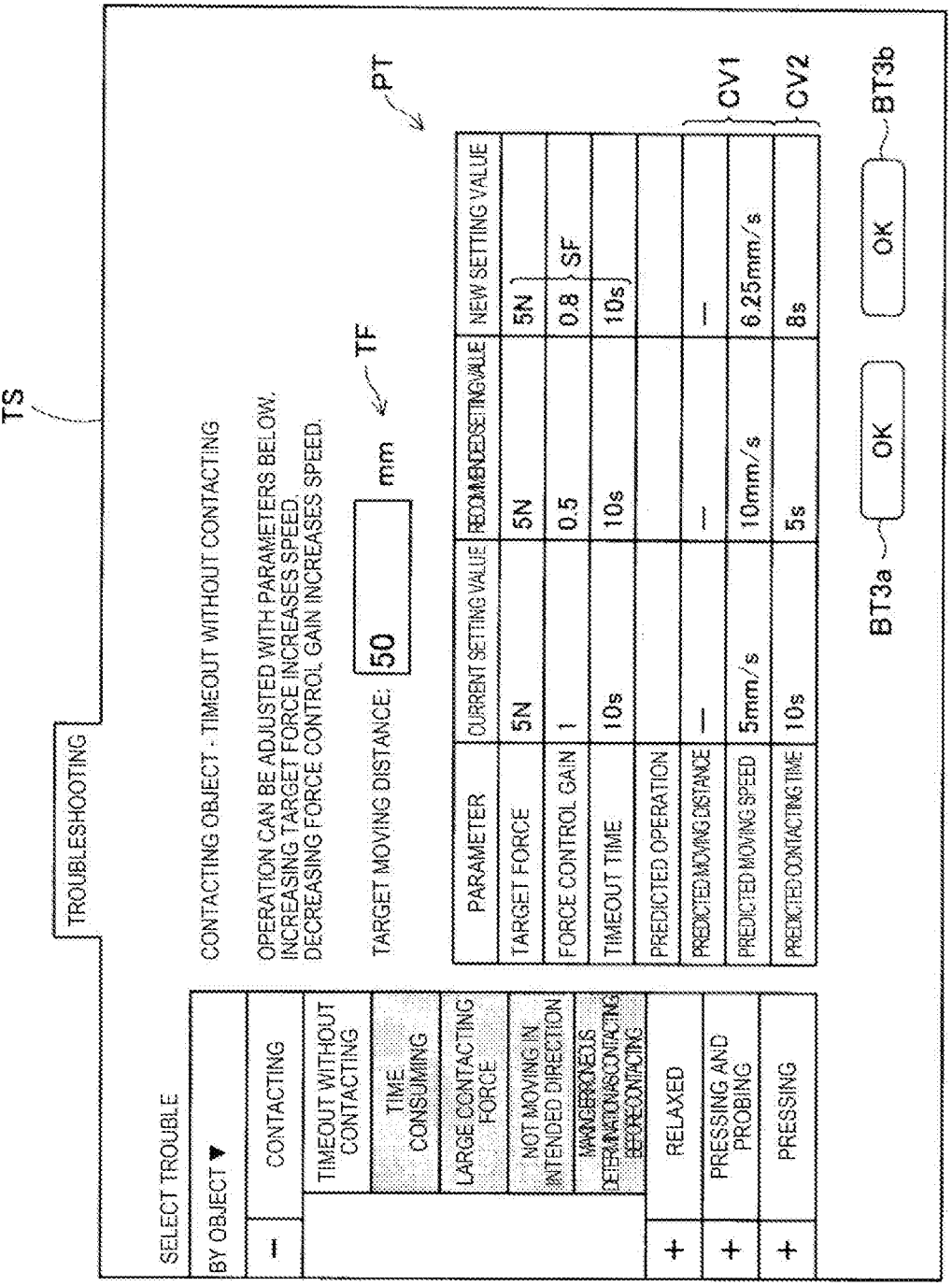
FIG. 15 is an explanatory diagram showing still another example of a countermeasure presentation area.

FIG. 15 shows the countermeasure presentation area TS displayed after the button BT4 for switching the screen for inputting the new setting value in FIG. 13 is pressed. In this example, in addition to the current setting value and the recommended setting value of the parameter, a setting value field SF for inputting the new setting value of the parameter is displayed. The value of setting value field SF can be arbitrarily changed by the teacher. Below the recommended setting value and the new setting value, buttons BT3a and BT3b indicating the acceptance of the setting value are displayed. The teacher can apply one of the recommended setting value and the new setting value by pressing either one of these buttons BT3a and BT3b. Accordingly, the teacher can set the appropriate setting value arbitrarily and easily solve the problem of the force control operation. When displaying the setting value field SF for inputting the new setting value of the parameter, the current setting value and the recommended setting value of the parameter may not be displayed.

Instead of inputting the new setting value of the parameter in the countermeasure presentation area TS, the new setting value of the parameter may be input in the parameter setting area PR shown in FIG. 1.

Figure 16:
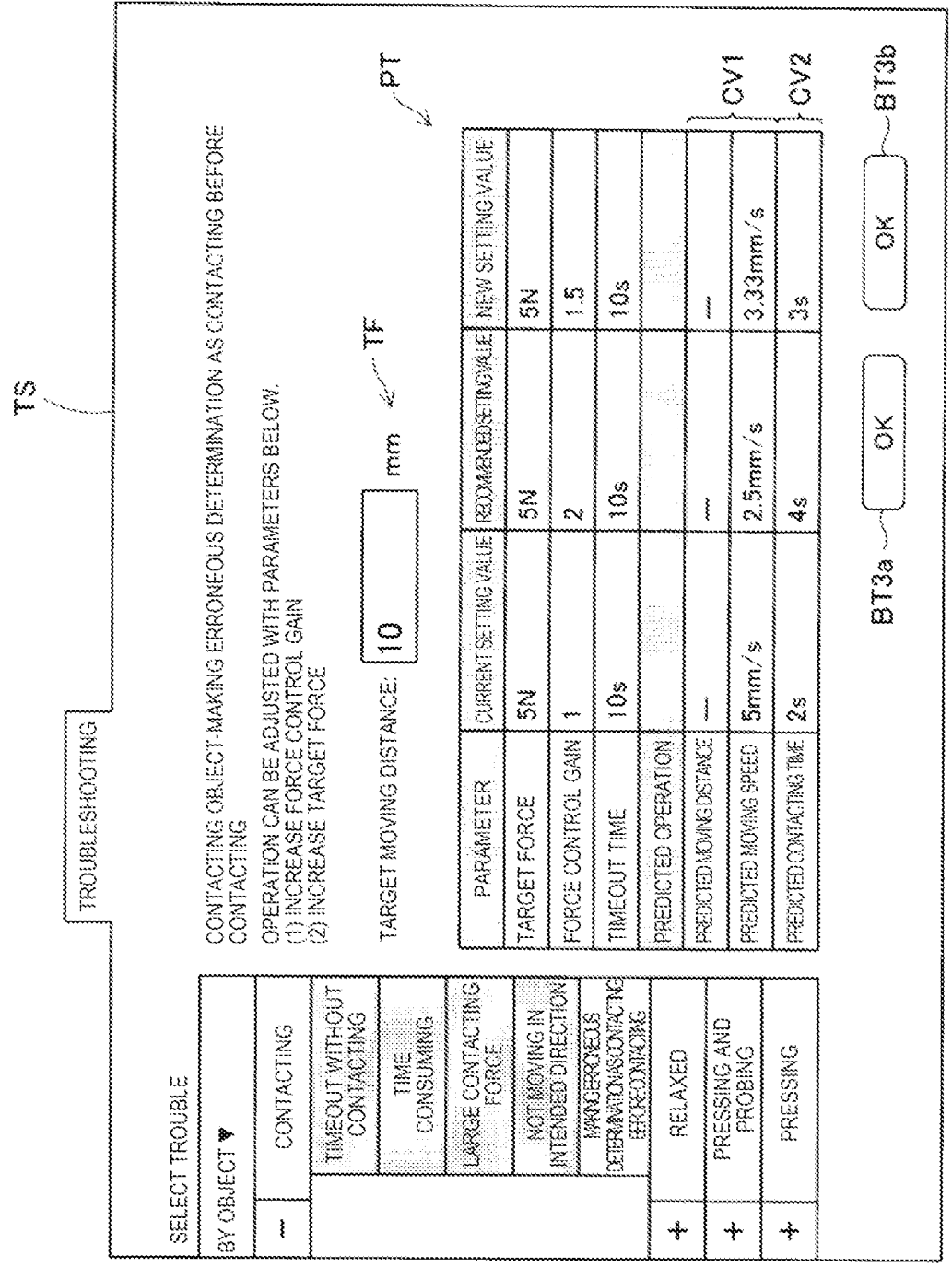
FIG. 16 is an explanatory diagram showing still another example of a countermeasure presentation area.

FIG. 16 shows an example of the countermeasure presentation area TS presenting the countermeasure against a problem of the contacting object "making erroneous determination as contacting before contacting". Here, as explanatory notes for explaining the direction of changing the parameter to solve the problem, two sentences, "increase force control gain" and "increase target force" are displayed. By displaying one or a plurality of explanatory notes in the countermeasure presentation area TS as explanatory notes for explaining the direction of changing the parameter to solve the problem, the teacher can more easily input the setting value for solving the problem.

Figure 17:
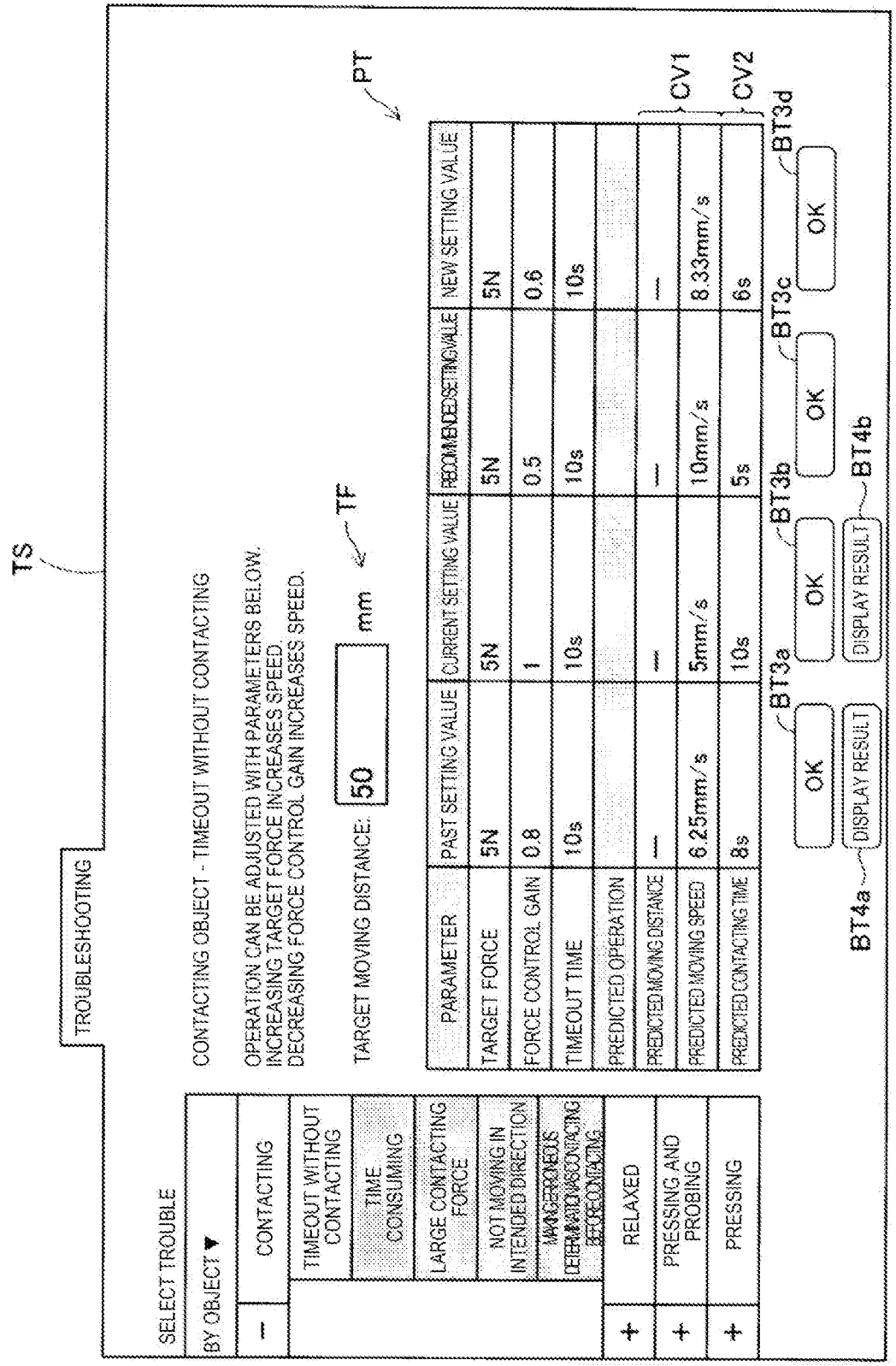
FIG. 17 is an explanatory diagram showing still another example of a countermeasure presentation area.

FIG. 17 shows an example of the countermeasure presentation area TS displayed after performing a plurality number of trials with the setting value of the parameter. In this example, the log of the setting value of the parameter is displayed in the parameter setting value table PT. Specifically, in the parameter setting value table PT, a past setting value, the current setting value, the recommended setting value, and the new setting value are displayed. With respect to each setting value, buttons BT3a to BT3d indicating the acceptance of the setting values are provided. Accordingly, for example, when the button BT3b is pressed, the setting value used in the past can be reselected. The number of past setting values is not limited to one, and a plurality of past setting values may be displayed as the log.

In FIG. 17, furthermore, display result buttons BT4a and BT4b for displaying the execution result of the operation flow in which the setting value is used are provided for the past setting value and the current setting value. When either one of these display result buttons BT4a and BT4b is pressed, the execution result of the operation flow in which the setting value is used is displayed in the main view area MV as shown in the FIG. 10A or FIG. 10B. As the execution result displayed at this time, it is preferable that the execution result corresponding to the various setting values included in the log of the setting value of the parameter is displayed in an identifiable manner. Thereby, the teacher can easily select the best execution result from the log of the setting value of the parameter.

In Step S120 of FIG. 5, parameter adjustment can be performed in various ways.

When the operation flow is completed as described above, the conversion unit 244 converts the operation flow into a control program according to the indication of the teacher in step S130 in FIG. 5. The indication can be performed, for example, by selecting "create control program" from the context menu of the operation flow creation area FL. It is preferable that any one method of the following three types of methods can be selectively performed for the conversion from the operation flow to a control program and execution.

(1) The operation flow is converted into a control program of the low level language. The teacher accesses and executes the converted control program of the low level language from the control program of the high level language separately written by the teacher. In this case, after the teacher creates work sequence, the control program of the sequence can be called out and executed for example, by writing "FGRun sequence name" among the control programs of the high level language separately written by the teacher. This is the most basic execution method.

(2) The operation flow is converted into a control program of the high level language, and execute the control program.

(3) The operation flow is converted into a control program of the low level language, and the control program is directly executed.

In the following description, the case where the above-described method (2) is mainly executed will be described.

Figure 18:
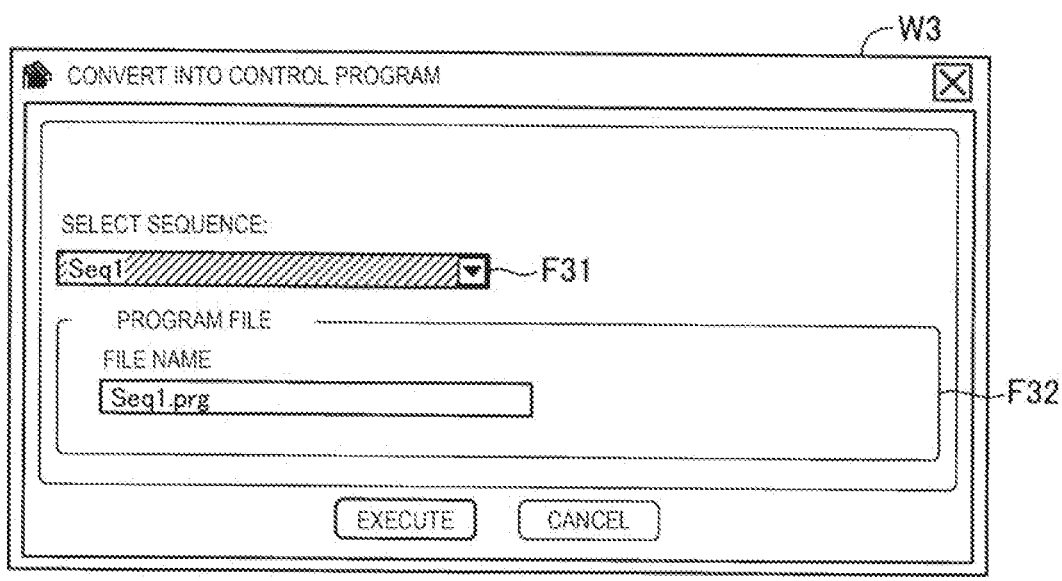
FIG. 18 is an explanatory diagram showing an example of an input screen when the operation flow is converted into a control program.

FIG. 18 shows an example of a window W3 as an input screen displayed when the operation flow is converted into a control program according to the indication of the teacher. This window W3 includes a sequence selecting area F31 for selecting a sequence (that is, an operation flow) to be converted into a control program and a program file name setting area F32 for setting the file name of the control program. The sequence selecting area F31 may be omitted. The window W3 may be configured to include an area for setting information such as a storage destination of parameters. In the window W3, when the "execution" button is pressed, the operation flow is converted into a control program by the conversion unit 244, and the control program is stored in the memory 220.

In step S140 of FIG. 5, the robot control device 200 controls the robot and causes the robot to execute the work according to the control program created in step S130. This work can be executed as a checking work for checking the operations of the robot 100 on the production line or an original work for manufacturing a product on the production line.

In the first embodiment, the display control unit 242 presents the countermeasure for realizing a predetermined operation set in advance in the case where the operation of the robot 100 is not the predetermined operation set in advance after the control program of the operation flow is executed by the control execution unit 250, so that it is possible to solve the problem of the operation and normally execute the operation.

In the first embodiment, an operation flow including a conditional branch can be easily created by graphically placing the operation object and the conditional branch object in the operation flow creation area FL, so that it is possible to easily teach recovery and end processing when the operation of the work in work fails. Since the operation flow of the robot is converted into a control program, it is possible to easily create a control program.

B. Other Embodiment

The present disclosure is not limited to the above-described embodiment, and can be realized in various aspects without departing from the gist thereof. For example, the present disclosure can be realized by the following aspects. For example, the technical features in the above-described embodiment corresponding to the technical features in each aspect described in each embodiment described below can be replaced or combined as appropriate to solve part or all of the above-mentioned problems of the present disclosure, or to achieve some or all of the above-mentioned effects of the present disclosure. Also, unless its technical features are described as essential in this specification, it can be deleted as appropriate.

(1) According to a first aspect of the present disclosure, there is provided a robot control device that creates a control program for work of a robot with a force detector. The robot control device includes a display control unit that displays an input screen including an operation flow creation area for creating an operation flow of work including a force control operation on a display device; a conversion unit that converts the created operation flow into a control program; and a control execution unit that executes the control program to control the robot. When an operation of the robot is not a predetermined operation set in advance after the control program is executed by the control execution unit, the display control unit is configured to display a screen for presenting a countermeasure for realizing the predetermined operation set in advance on the display device.

According to the robot control device, after the control program is executed by the control execution unit, the display control unit presents a countermeasure for realizing the predetermined operation set in advance, so that it is possible to normally execute the operation and a teacher can easily create a control program without problems.

(2) In the robot control device, the display control unit may be configured to display an item indicating that the operation of the robot is not the predetermined operation set in advance from an execution result of the control program, and display the screen on the display device.

According to the robot control device, since the item indicating that the operation is not the predetermined operation set in advance from the execution result of the control program is displayed, it is possible to normally execute the operation and a teacher can easily create a control program without problems.

(3) In the robot control device, the countermeasure may include a parameter related to the item among a plurality of parameters specifying the force control operation.

According to the robot control device, since the countermeasure includes the parameter related to the item among the plurality of parameters specifying the force control operation, a teacher can easily create a control program without problems.

(4) In the robot control device, the display control unit may be configured to display a current setting value and a recommended setting value of the parameter on the screen when the item is displayed.

According to the robot control device, since the current setting value and the recommended setting value of the parameter are displayed on the screen when the item is displayed, a teacher can easily create a control program without problems.

(5) In the robot control device, the display control unit may be configured to display a first characteristic value calculated from the recommended setting value of the parameter on the screen.

According to the robot control device, since the first characteristic value calculated from the recommended setting value of the parameter is displayed, a teacher can easily create a control program without problems from the first characteristic value.

(6) In the robot control device, when a target value is input in a target value field for inputting the target value of the force control operation, the display control unit may be configured to display a second characteristic value calculated from the target value and the recommended setting value of the parameter on the screen.

According to the robot control device, since the second characteristic value calculated from the target value and the recommended setting value of the parameter is displayed when the target value of the force control operation not determined from the parameter is input, a teacher can easily create a control program without problems from the second characteristic value.

(7) In the robot control device, the display control unit may be configured to display a setting value field for inputting a new setting value of the parameter on the screen.

According to the robot control device, since the setting value field for inputting the new setting value of the parameter is displayed, a teacher can easily create a control program without problems by arbitrarily setting an appropriate setting value in the setting value field.

(8) In the robot control device, when the operation of the robot is the predetermined operation set in advance, after the control program is executed by the control execution unit using the new setting value input in the setting value field, the display control unit may be configured to display a screen for presenting the execution result of the control program on the display device.

According to the robot control device, since the screen for presenting the execution result is displayed after the control program is executed using the new setting value, a teacher can easily determine whether the problem of the operation is solved or not, and can create a control program without problems.

(9) In the robot control device, the display control unit may be configured to display a log of a setting value of the parameter, and display the screen in a manner configured to select a past setting value of the parameter from the log.

According to the robot control device, since the past setting value can be selected from the log of the setting value of the parameter, a teacher can easily solve the problem of the operation, and can create a control program without problems.

(10) According to a second aspect of the present disclosure, there is provided a robot control device that creates a control program for work of a robot with a force detector. The robot control device includes a processor in which the processor is configured to (a) display an input screen including an operation flow creation area for creating an operation flow of work including a force control operation on a display device, (b) convert the created operation flow into a control program, and (c) execute the control program to control the robot. When an operation of the robot is not a predetermined operation set in advance after the control program is executed, the processor displays a screen for presenting a countermeasure for realizing the predetermined operation set in advance on the display device.

According to the robot control device, since the countermeasure for realizing the predetermined operation set in advance is presented after the control program is executed, it is possible to normally execute the operation and a teacher can easily create a control program without problems.

The present disclosure can be realized in various aspects other than the described above. For example, it can be realized in aspects of a robot system including a robot and a robot control device, a computer program for realizing functions of a robot control device, a non-transitory storage medium storing the computer program, and the like.

What is claimed is:

1. A robot control device that creates a control program for work of a robot with a force detector, the device comprising:

a processor, wherein
the processor is configured to:
  display an input screen including an operation flow creation area for creating an operation flow of work including a force control operation on a display device, wherein the operation flow is created by adding or deleting at least one of sequence block, operation object block or conditional branch object block into or from the operation flow creation area;
  convert the created operation flow into a control program; and
  execute the control program to control the robot, and
when an operation of the robot is not a predetermined operation set in advance after the control program is executed, the processor displays a screen for presenting a countermeasure for realizing the predetermined operation set in advance on the display device,
wherein the processor is configured to: display an item indicating that the operation of the robot is not the predetermined operation set in advance from an execution result of the control program,
display the screen on the display device,
wherein the countermeasure includes a parameter related to the item among a plurality of parameters specifying the force control operation,
wherein the processor is configured to display a current setting value and a recommended setting value of the parameter on the screen when the item is displayed,
wherein the processor is configured to display a first characteristic value calculated from the recommended setting value of the parameter on the screen,
wherein when a target value is input in a target value field for inputting the target value of the force control operation, the processor is configured to display a second characteristic value calculated from the target value and the recommended setting value of the parameter on the screen, the second characteristic value, the target value and the recommended setting value are different types of data.

2. The robot control device according to claim 1, wherein the processor is configured to display a setting value field for inputting a new setting value of the parameter on the screen.

3. The robot control device according to claim 2, wherein when the operation of the robot is the predetermined operation set in advance, after the control program is executed by the control execution unit using the new setting value input in the setting value field, the processor is configured to display a screen for presenting the execution result of the control program on the display device.

4. The robot control device according to claim 1, wherein the processor is configured to:
display a log of a setting value of the parameter; and
display the screen in a manner configured to select a past setting value of the parameter from the log.

* * * * *